United States Patent
Henry

(10) Patent No.: US 6,556,067 B2
(45) Date of Patent: Apr. 29, 2003

(54) CHARGE PUMP REGULATOR WITH LOAD CURRENT CONTROL

(75) Inventor: George C. Henry, Camarillo, CA (US)

(73) Assignee: Linfinity Microelectronics, Irvine, CA (US)

( * ) Notice: Subject to any disclaimer, the term of this patent is extended or adjusted under 35 U.S.C. 154(b) by 0 days.

(21) Appl. No.: 09/880,545

(22) Filed: Jun. 12, 2001

(65) Prior Publication Data

US 2002/0008499 A1 Jan. 24, 2002

Related U.S. Application Data

(60) Provisional application No. 60/211,167, filed on Jun. 13, 2000.

(51) Int. Cl.$^7$ ................................................ G05F 1/10
(52) U.S. Cl. ........................................ 327/536; 327/538
(58) Field of Search ................................ 327/536, 148, 327/157, 143, 538, 540

(56) References Cited

U.S. PATENT DOCUMENTS

| | | | |
|---|---|---|---|
| 5,553,030 A | | 9/1996 | Tedrow et al. |
| 5,717,581 A | | 2/1998 | Canclini |
| 5,920,225 A | * | 7/1999 | Choi et al. ................... 327/156 |
| 6,067,336 A | | 5/2000 | Peng |
| 6,107,862 A | * | 8/2000 | Mukainakano et al. ...... 327/536 |
| 6,111,470 A | * | 8/2000 | Dufour ........................ 327/156 |
| 6,181,210 B1 | * | 1/2001 | Wakayama ................. 327/157 |
| 6,320,435 B1 | * | 11/2001 | Tanimoto ..................... 327/156 |
| 6,385,265 B1 | * | 5/2002 | Duffy et al. ................. 327/157 |

OTHER PUBLICATIONS

George C. Henry; Copending U.S. patent application entitled Multiple Output Charge Pump; application Ser. No. 09/880,528; filed Jun. 12, 2001.

George C. Henry; Copending U.S. patent application entitled Single Mode Buck/Boost Regulated Charge Pump; application Ser. No. 09/880,626; filed Jun. 12, 2001.
Maxim; Product specification for Max 1759 Buck/Boost Regulating Charge Pump; Jan. 2000 (Rev. 0).
Texas Instruments; Product specification for TPS60100 Regulated 2.2 V 200–mA Low–Noise Charge Pump DC/DC Converter; SLVS213B, May 1999, Revised 1999.
Linear Technology Corporation; Product specification for LTC1615/LT1615–1 Micropower Step–up DC/DC Converters in SOT–23; 1999.
Linear Technology Corporation; Product specification for LTC1754–3.3/LTC1754–5 Micropower, Regulated 3.3V/5V Charge Pump with Shutdown in SOT–23; 1999.
Linear Technology Corporation; Product specification for LTC1682/LTC1682–3.3/LTC1682–5 Doubler Charge Pumps with Low Noise Linear Regulator, 1999.
National Semiconductor Corporation; Product specification for LM3352 Regulated 200 mA Buck–Boost Switched Capacitor DC/DC Converter; Sep. 1999.

* cited by examiner

Primary Examiner—Kenneth B. Wells
Assistant Examiner—Cassandra Cox
(74) Attorney, Agent, or Firm—Knobbe, Martens, Olson & Bear LLP

(57) ABSTRACT

A multiple output regulating charge pump includes a load current regulator to balance currents in multiple branches of at least one load, such as light emitting diodes in a parallel configuration. The load current regulator includes current mirror circuits to provide substantially identical currents to the respective light emitting diodes, thereby producing uniform light from each of the light emitting diodes. The multiple output charge pump includes a charge storage component that is alternately charged during a charge cycle and discharged during a discharge cycle. The charge pump provides current to a second load during the charge cycle and to a first load during a discharge cycle.

12 Claims, 16 Drawing Sheets

CHARGE PUMP REGULATOR WITH LOAD CURRENT CONTROL

RELATED APPLICATIONS

This application claims the benefit of U.S. Provisional Application No. 60/211,167, filed on Jun. 13, 2000, and entitled A Single Mode, Buck/Boost, Regulating Charge Pump, A Method to Improve the Efficiency Thereof, and a System Using the Charge Pump in a Combination LED Current Regulator and Voltage Converter.

BACKGROUND OF THE INVENTION

1. Field of the Invention

The present invention relates to the field of voltage converters and in particular to a charge pump voltage converter.

2. Description of the Related Art

Many electrical devices require power supplied at a stable voltage different than that provided by a primary power source. In many applications, the primary power source is a battery. Often the electronic devices require voltages that are between 1 and 2 times the voltage provided by the battery. An additional requirement is that the voltage provided be relatively stable. A low voltage can result in the powered devices failing to operate at all or at a reduced performance level. Steady overvoltage can reduce the life of the devices or permanently damage the devices. Spikes or transients in voltage can also disrupt device operation and cause damage.

One difficulty with batteries is that many batteries do not provide a stable output voltage. The output voltages of many batteries decrease as the batteries are used and as the batteries age. The voltages can also vary depending on how heavily the batteries are loaded. Certain batteries also vary in output voltage with variations in temperature. Even under conditions where the battery voltage is not varying, the battery may provide power at a different voltage than that required by user devices.

Charge pumps are known circuits that effectively transfer electrical charge back and forth between storage components to generate an output voltage different from an input voltage. Charge pumps with a "buck" feature are effectively voltage limiters. If the input voltage exceeds a threshold value, the charge pump "bucks" the overvoltage away from the load. However, in a charge pump circuit, the charge is not simply shunted to ground or another load as in, for example, zener diode circuits. A charge pump temporarily stores the charge redirected from the load, typically in a capacitive element. This charge stored in the capacitor is then typically delivered to the load at a later time. Zener diodes are effective at clamping voltages above a certain threshold; however, by simply shunting the current away from the load, the current is typically not available for use. This results in wasted power. It will be appreciated that wasting power in a device with limited battery capacity is preferably avoided.

In a "boost" operation, a charge pump accumulates charge to be able to provide a greater voltage to the load than is provided by the input voltage. A charge pump in boost operation typically sequentially charges at least one capacitor connected in parallel with the power source and then selectively interconnects the capacitor(s) in series with power source to increase the available voltage for delivery to the load. Typical charge pump circuits double or triple the input voltage minus some switching and other loses. Again, it will be appreciated that minimizing loses from a limited power source such as a battery is desirable.

Charge pump circuits are often used in consumer electronics, such as PDAs, cell phones, and the like. Thus, it will be appreciated that simplicity and low cost are highly desirably. With potential markets in the millions of units, a reduction in cost of only a few cents can add up to significant savings and increased profits for the manufacturers and sellers. An additional design goal is to reduce size and weight of the devices. Reduced size and weight increases the convenience of an appliance to the consumer and increases the marketability of the appliance. Many known charge pump designs employ multiple operating modes that increase circuit complexity and cost of the charge pumps. Multiple operating modes also generally lead to voltage transients upon switching between the multiple modes, which again can damage powered devices.

An additional problem with the charge pump circuits is that the conversion efficiency declines very quickly when the output voltage is less than twice the input voltage. The general rule for any charge pump is that input current will always be twice the output current when the circuit is in equilibrium. Current is drawn from the battery on every clock cycle; however, it is only supplied to the load every other clock cycle. Thus, the instantaneous current is the same in the input and output sides, but the time average current for the input is twice the output. Since efficiency is the ratio of power out divided by power in, and input current is always twice output current, the maximum theoretical efficiency can be calculated as follows:

$$Eff = Pout/Pin$$

$$Eff = (Iout \times Vout)/(Iin \times Vin)$$

$$Eff = (Iout \times Vout)/(2 \times Iout \times Vin)$$

$$Eff = (Vout/(2 \times Vin)) \times (100\%)$$

Therefore:

Eff=100% max when Vout=2 Vin

Eff=50% max when Vout=Vin

Eff=25% max when Vout=½ Vin

In practical circuits, it is reasonable to expect 10% losses in the converter because of resistive losses in switching components and junction drops. The actual predictions made by multiplying the theoretical predictions above by 90% are 90%, 45% and 22%, respectively.

One reason for the low efficiency numbers when Vout is <2 Vin is that the charge current for the transfer capacitor Cx flows from the battery directly to ground without imparting its full energy on Cx, (i.e., Cx is not charged to the battery's full potential). Thus, the voltage difference between the available battery potential and the voltage needed to charge Cx to obtain the desired output voltage is available, but is not utilized.

Many real world battery-powered applications that include multiple loads with different power requirements and meet the criteria for using a secondary load output from the charge pump. For example, cellular telephones and handheld computers (PDAs) are typically powered by single cell Lithium-ion or triple cell NiCad batteries having terminal voltages that range from 5.6 volts at full charge to 3.0 volts at cutoff. A common requirement in these products is to provide one regulated output voltage in the 5-volt to 3.3-volt range and to provide a second regulated output voltage in the 2.5-volt 1.5-volt range.

A very specific application in the cellular phone product area is driving a combination of white and green LEDs that light a color display and a keypad. White LEDs are needed to provide good color from a liquid crystal thin film transistor (TFT) display. These white LEDs typically have forward voltage drops of 3.6V and draw approximately 20 mA each. Therefore. the white LEDs require a buck/boost voltage converter to operate from the normal 5.6-volt to 3.0-volt battery potential. An additional requirement for the white LEDs is that all the LEDs generate approximately the same light intensity in order to achieve uniform lighting in the display.

The cell phone also uses a lighted key pad, but this can use lower cost and lower voltage green LEDs. Uniformity of lighting and color trueness of the keypad is less of a concern than with the display. Green LEDs operate at 2.0 volts at 10 mA drive levels, thus using less power per LED (≈20mW) than white LEDs (≈72mW). However, because the electrical requirements of green and white LEDs differ, two separate circuits are typically required to enable to advantages of using green and white LEDs.

In order to maintain a constant and consistent light output, multiple LEDs require a constant current rather than constant voltage. One method of driving LEDs is to use a constant voltage source with current limiting ballast resistors in series with the LEDs to sense and/or control forward current. Multiple LEDs can be driven in parallel or in series. If in series, only one series resistor is required for the LEDs in that branch, however the supply voltage must be high enough to support the sum of the forward voltages of the LEDs. Unfortunately, the voltage required for two or more LEDs is higher than readily achievable with a switched capacitor charge pump fed by a typical battery.

When multiple LEDs are driven in parallel, the supply voltage only needs to be in the 4V range, which is easily achievable with a charge pump operating from a 3-volt battery. In the parallel case, each LED has its own series resistor to control and balance its current. However, this approach has two weaknesses:

1) Current matching among the LEDs is needed to insure equal light output. Individual LEDs will have different forward voltage drops at equal drive currents. Because of this, the value of a series ballast resistor must be fairly high to control current sharing without undertaking the significant time and expense of testing and selecting LEDs for minimal variations in forward voltage. Typically, dropping at least one-fourth of the forward voltage of the LEDs would be needed to maintain less than 10% current variation among the multiple LEDs. With a primary supply voltage of 3.0 volts providing power to a charge pump powering white LEDs with 3.6-volt forward voltage drops, 0.9 volts would typically be needed across the series resistor to achieve less than 10% current variation. This would result in a 20% loss because one-fifth of the total supply voltage is used in the ballast resistor and energy is lost to resistive heating rather being used for the desired light production.

2) The product would be burdened with the extra space and cost of the series resistors.

Thus, from the foregoing it will be appreciated that there is a need for an efficient charge pump that provides both buck and boost operations and that provides an output voltage that is regulated to provide a stable output voltage even in the presence of variations in an input voltage. A need also exists for a regulating charge pump of simple design that avoids the cost and complexity of multiple operating modes. A need also exists for a charge pump that avoids switching between multiple operation modes and that minimizes switching transients. Furthermore, a need exists for a buck/boost capable charge pump that can provide regulated outputs at different voltage levels with a single circuit. Advantageously, such a multiple output regulating charge pump operates with improved efficiency. Moreover, a need exists for a single circuit that provides multiple voltage regulated outputs and that also regulates the current in multiple branches of at least one of the outputs so as to facilitate powering LEDs in a highly efficient and balanced manner.

SUMMARY OF THE INVENTION

One aspect of the present invention solves these and other problems by providing a single mode buck/boost charge pump that provides a regulated constant output voltage between zero and twice an input voltage without changing control modes or interrupting circuit operation when the input voltage falls below or rises above a set output voltage. In one embodiment, a single mode buck/boost charge pump is adapted to power a plurality of separate loads in a highly efficient manner. In another embodiment, a single mode buck/boost charge pump is a combination current regulator and multiple output regulating charge pump adapted for driving LEDs in a highly efficient and balanced manner.

In one aspect of the present invention, a regulating charge pump provides buck and boost operation in a single operating mode wherein the charge pump provides an output voltage that is a multiple of an independent reference voltage and wherein a charge storage component is charged by a regulated variable current supply. In one embodiment, the variable current supply is regulated with respect to the reference voltage and the output voltage and the charge storage component is alternately charged by the regulated variable current supply and connected in series with the output. In certain embodiments, the charge storage component is inhibited from being charged when connected in series with the output.

In certain embodiments, the reference voltage is a fixed voltage, and in alternative embodiments, the reference voltage is selectable from among a plurality of voltage values.

In another aspect of the present invention, a regulating charge pump receives a supply voltage and provides a regulated output voltage. The charge pump comprises a charge storage component, a plurality of switches interconnecting the charge storage component and the supply voltage, a switch timing control that regulates the states of the plurality of switches, a reference voltage source, an error amplifier connected to the reference voltage source and the regulated output, and a variable current supply that receives control signals from the error amplifier and provides regulated current to the charge storage component in response to the output voltage, wherein the output voltage is regulated with respect to the reference voltage source. In particular embodiments, the switch timing control alternately connects the charge storage component to the variable current supply and in series with the regulated output. In certain embodiments thereof, the switch timing control inhibits connecting the charge storage component to the variable current source and the output simultaneously. The switch timing control operates in a periodic fashion.

In certain embodiments, the reference voltage is a fixed voltage. In alternative embodiments, the reference voltage is selectable from among a plurality of voltage values. In other embodiments, the error amplifier comprises a feedback network and in certain embodiments thereof, the feedback network comprises a voltage divider connected to the regulated output.

In a further aspect of the present invention, a method provides a stable output voltage. The method comprises providing an input voltage and providing a reference voltage. The method sequentially charges a charge storage component via a regulated variable current source and connects the charge storage component in series with the input voltage so as to generate the output voltage. The method monitors the output voltage and regulates the charging of the charge storage component such that the output voltage is a multiple of the reference voltage.

In one embodiment, the present invention is useful in charge pump applications where a supply voltage, Vin, is higher than a minimum supply voltage needed to provide the output voltage Vout. Thus, the charge component is not charged to a maximum value that it can reach. The difference between the minimum supply voltage and the maximum voltage on the charge storage component is used to generate a second voltage output from the circuit. The second voltage output is supplied to a second, separate load. In this aspect, the present invention is able to supply different multiple regulated outputs from a single input voltage. In certain embodiments, the input voltage is lower than one output voltage and higher than the other output voltage.

For example, at a minimum battery voltage of 3.0V, white LEDs require a 0.6-volt boost, plus about 200 mV to implement a constant current driver. Thus, the minimum output voltage provided to white LEDs must be about 3.9 volts to account for other circuit losses. The total boost required from a charge pump is then 3.9−3.0=0.9 volts. Since the minimum battery voltage is 3.0 volts and the 0.9-volt boost must appear across the charge transfer component while it is being charged, the difference of 2.1 volts (3.0−0.9) is available to drive the second load. It is common to use four green LEDs operating at 10 mA to light the keypad. The remaining 2.1 volts is adequate to do this with 100 mV left over for circuit losses. The total current required by two white LEDs is approximately the same as required by the four green LEDs. This is advantageous because virtually all of the unused energy from the charge pump can be diverted to the green LEDs. In addition, since both the white LEDs and the green LEDs are typically turned on at the same time, it is advantageous to share the same charge pump circuit.

In one aspect of the present invention, a charge pump receives a supply voltage wherein the charge pump provides multiple regulated outputs. In one particular embodiment, the multiple regulated outputs are at different voltages, and at least one of the multiple outputs is regulated at a voltage different than the supply voltage. In certain embodiments, the outputs are regulated independently with respect to input voltage.

In another aspect of the present invention, at least one of the outputs is regulated with respect to a parameter of a load connected to the at least one output. In one particular embodiment, the parameter of the load corresponds to an output node of the load. In another embodiment, regulating the at least one output with respect to the parameter of the load automatically compensates the at least one output for variations in the parameter of the load. In this embodiment, the variations in the parameter of the load include variations due to temperature change.

In a further aspect of the present invention, a multiple output regulating charge pump receives a supply voltage. The charge pump comprises a charge storage component, a plurality of switches interconnecting the charge storage component and the supply voltage, a switch timing control that regulates the state of the plurality of switches, a reference voltage source, and a feedback circuit that provides regulated current to the charge storage component in response to the output voltage, wherein the output voltage is regulated with respect to the reference voltage source. In certain embodiments, the multiple outputs provide regulated voltages to at least a first load and a second load. In a particular embodiment, the output voltage is further regulated with respect to at least one of the first load and the second load. In an embodiment thereof, the output voltage is regulated with respect to an output node of at least one of the first load and the second load.

In yet another aspect of the present invention, the switch timing control operates the switches so as to alternately charge and discharge the charge storage component. In one embodiment, charging the charge storage component comprises connecting the charge storage component in series with the supply voltage and the second load, and discharging the charge storage component comprises connecting the charge storage component in series with the supply voltage and the first load. In a certain embodiment, current is provided to the first load as the charge storage component is discharged and is provided to the second load as the charge storage component is charged. In another embodiment, the switch timing control operates the switches so as to inhibit having the charge storage component connected in series with the supply voltage and both the first and the second loads simultaneously.

In particular embodiments of the invention, the feedback circuit comprises a variable current source and an error amplifier and the voltage reference provides a fixed reference voltage. In a further embodiment, the reference voltage is selectable among a plurality of reference voltage values.

In one embodiment, a multiple output regulated charge pump is combined with constant current sinks for multiple white LEDs to provide an LED driver and a load current regulator with higher efficiency. This also results in a lower component count. In addition, a greater accuracy can be obtained for cell phone and PDA applications that must operate from batteries having voltages that range from 3.0 volts to 5.6 volts. The device is scaleable to different quantities of LEDs by simply adding a current sink for each additional white LED in the application. The load current regulator is capable of maintaining less than 10% current variation among the white LEDs with only a 300 mV overhead and eliminates the need for ballast resistors in the load.

In one aspect of the present invention, a multiple output regulating charge pump receives a supply voltage and provides at least a first regulated output and a second regulated output. The first regulated output has a voltage that can be regulated at a level different than the voltage of the supply, and the current provided to a load by the first output voltage is actively current regulated. In certain embodiments, the first output is voltage regulated with respect to an output node of the load connected to the first output, thereby automatically compensating for variations in load characteristics.

One aspect of the present invention is a charge pump with a charge storage component and a plurality of switches connected to the charge storage component under control of a switch timing control circuit. The switch timing control circuit controls the switches to sequentially connect the charge storage component to the supply in series with the first output and then in series with the second output. The charge storage component is alternately charged when connected in series with the second output and discharged when connected in series with the first output so as to provide the first regulated output voltage. The switch timing control operates to prevent the charge storage component being connected to both the first and the second outputs simultaneously. In certain aspects of the invention, the switch timing control receives timing signals from an oscillator such that the switch timing control circuit operates to open and close the switches in a periodic fashion.

In another aspect of the present invention, a current is supplied to a load connected to the second output when the charge storage component is being charged and at least the first output is voltage and current regulated so as to provide substantially equal currents to multiple branches of the load connected to the first output.

Another aspect of the invention is a load current regulator that regulates the current provided to the load connected to the first output. In particular, the load current regulator regulates the current among the multiple branches of the load connected to the first output such that the current in each of the branches of the load is substantially equal.

In certain embodiments, the load current regulator comprises a plurality of transistors arranged in a current mirror configuration and the load connected to the at least first output comprises a light emitting diode.

A further aspect of the present invention is a regulating charge pump that receives a supply voltage and that provides regulated voltages to at least two loads. The charge pump comprises a charge storage component, a variable current source, an error amplifier that receives feedback from at least one of the loads and provides control signals to the variable current source, and a plurality of switches that interconnect the supply, the charge storage component, the variable current source, the error amplifier, and the at least two loads. A switch timing control circuit controls the operation of the switches such that the variable current source can supply current to the charge storage component and directly to at least one of the loads. A load current regulator is connected to at least one of the loads such that currents within multiple branches of the load are actively balanced.

In certain embodiments, the error amplifier receives feedback from an output node of the at least one load. The switch timing control circuit operates the switches such that the charge pump alternately provides regulated voltage to a first load as the charge storage component discharges and provides regulated voltage to a second load as the charge storage component is charged.

In certain embodiments in accordance with the foregoing aspects of the present invention, the charge pump includes a switch timing control circuit that operates the switches in a periodic manner. The switch timing control circuit prevents all the switches from being turned on at the same time. The load current regulator comprises a plurality of transistors arranged in a current mirror configuration.

The foregoing aspects of the present invention will become more fully apparent from the following description taken in conjunction with the accompanying drawings.

BRIEF DESCRIPTION OF THE DRAWINGS

Embodiments of the present invention will be described in detail below in connection with the accompanying drawings, in which.

DETAILED DESCRIPTION OF THE INVENTION

Figure 1:
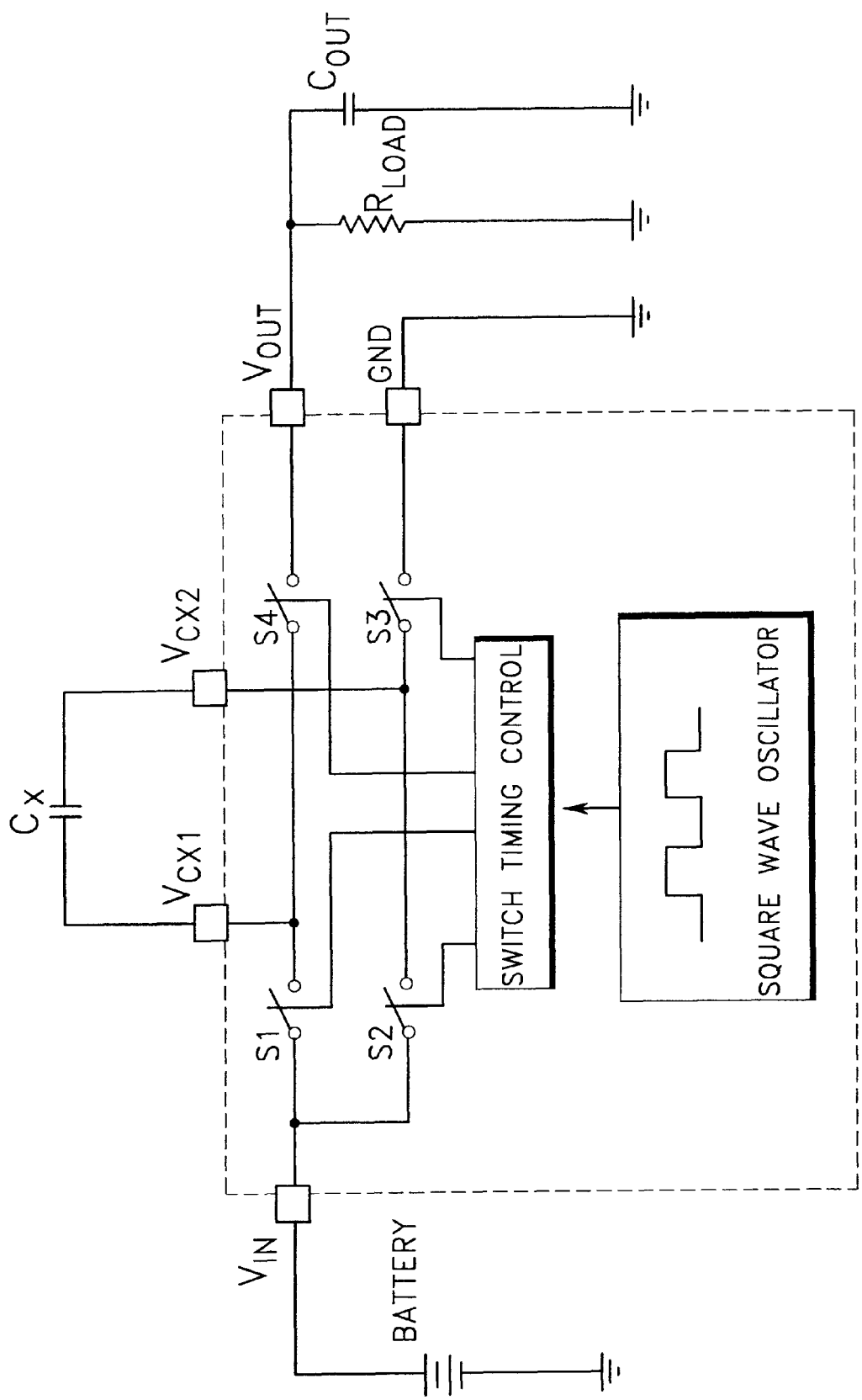
FIG. 1 is a circuit diagram of a typical prior art unregulated switched capacitor voltage doubler.
Figure 2:
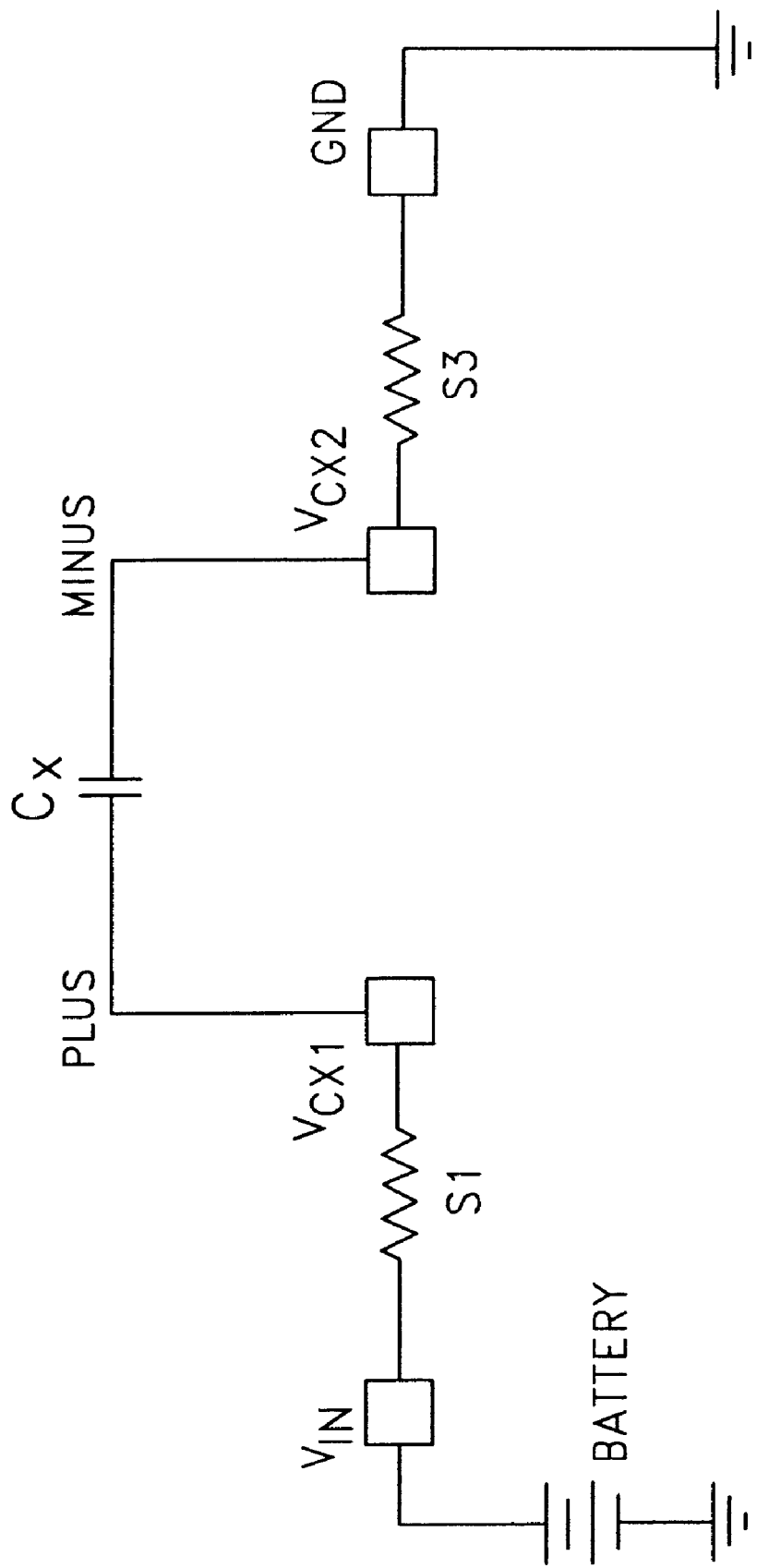
FIG. 2 is an equivalent circuit diagram of the circuit of FIG. 1 during a charge half-cycle.
Figure 3:
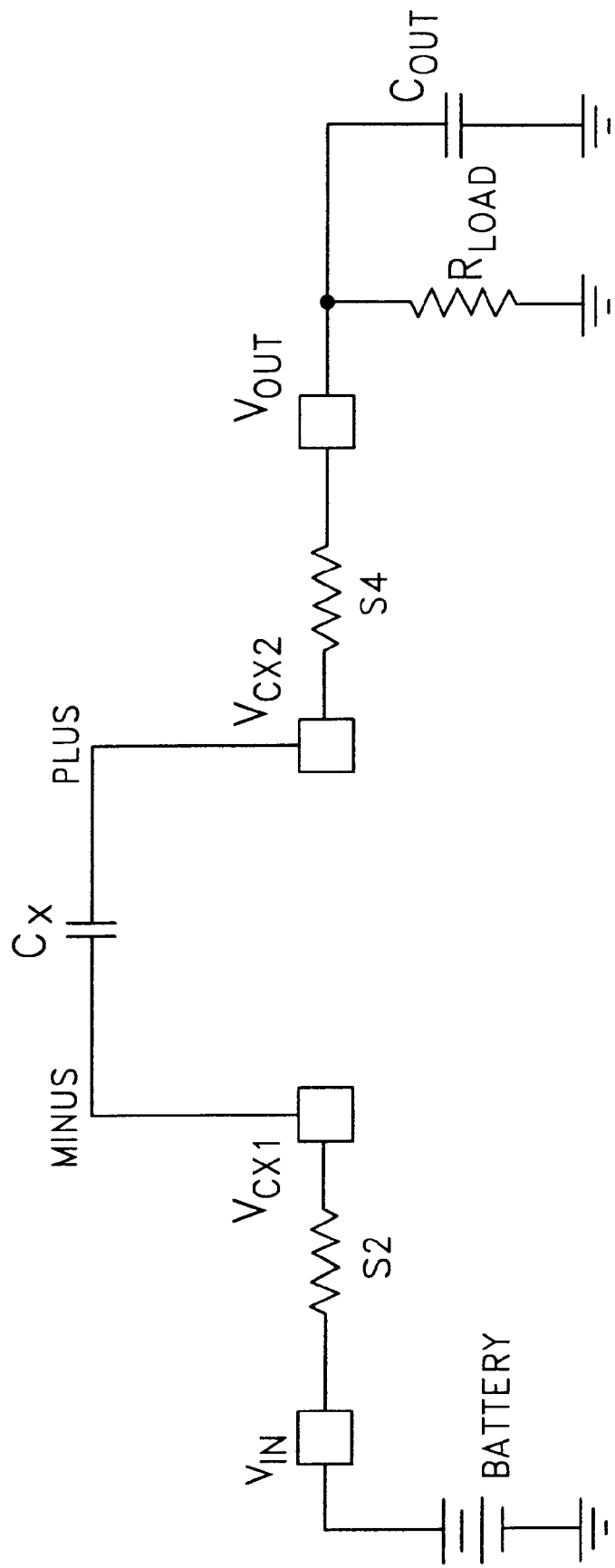
FIG. 3 is an equivalent circuit diagram of the circuit of FIG. 1 during a discharge half-cycle.

Reference will now be made to the drawings wherein like numerals refer to like parts throughout. FIGS. 1–3 illustrate a typical prior art charge pump voltage doubler circuit. The charge pump circuit includes four semiconductor switches, S1–S4, represented in the drawings as single-pole, single-throw (SPST) switches. The four switches are controlled to alternately connect a charge transfer capacitor, $C_x$, in parallel with a source supply (e.g., a battery) during a charge half cycle illustrated in FIG. 2, and to then connect the charge transfer capacitor, $C_x$, in series with the supply and a load during a discharge half cycle illustrated in FIG. 3. A load resistor, $R_{load}$, is connected in parallel with an output capacitor, $C_{out}$. The output capacitor stores energy transferred from the transfer capacitor, $C_x$, during the discharge half cycle in FIG. 3 and transfers the energy to the load during the charge half cycle in FIG. 2. The odd numbered switches, S1 and S3, are closed during the charge half cycle (FIG. 2), and the even numbered, S2 and S4, are closed during the discharge half cycle (FIG. 3). A square wave oscillator generates a timing signal to a switch timing control circuit. The switch timing control circuit generates control signals to the four switches that determine when the switches are opened and closed. The switch timing control circuit turns off the switches S1 and S3 before turning on the switches S2 and S4. Similarly, the switch timing control circuit turns off the switches S2 and S4 before turning on the switches S1 and S3. This "dead time" between the opening of one pair of switches and the closing of the other pair of switches prevents both sets of switches from being on at the same time.

In the following discussion, the following relationships between the elements in FIGS. 1–3 are assumed:

$C_x$ charge time=$C_x$ discharge time $C_x$ charge current>$C_x$ discharge current during start up.

$C_x$ charge current=$C_x$ discharge current during steady state operation.

Voltage across $C_x$=Voltage across $V_{in}$ $V_{out} \approx 2 \times V_{in}$

In FIG. 2, when S1 and S3 are closed, the semiconductor switches have on resistances of approximately 5 ohms and are represented by resistors $R_{S1}$ and $R_{S2}$, respectively. Using this representation, it can be seen that:

$C_x$ charge current=$[V_{IN}/(R_{S1}+R_{S3})] \times [e^{-t/RC}]$, where RC=$(R_{S1}+R_{S3})(C_x)$ In FIG. 3, S2 and S4 are closed and are represented by 5-ohm resistors, $R_{S2}$ and $R_{S4}$, respectively. Thus, it can be seen that:

$C_x$ discharge current=$[(VIN-VOUT)/(R_{S2}+R_{S4})] \times [e^{-t/RC}]$, where RC=$(R_{S2}+R_{S4}) \times (C_x)$,
and where $C_{out} >> C_x$.

In the configuration illustrated in FIGS. 1–3, the output voltage, $V_{out}$, is a function of the input voltage, $V_{in}$, and is determined both by circuit component values and by $V_{in}$. Thus, the output voltage will vary with the input voltage. As previously mentioned, variations in the output voltage of a charge pump can have deleterious effects on other circuits and components receiving power from the charge pump.

Figure 4:
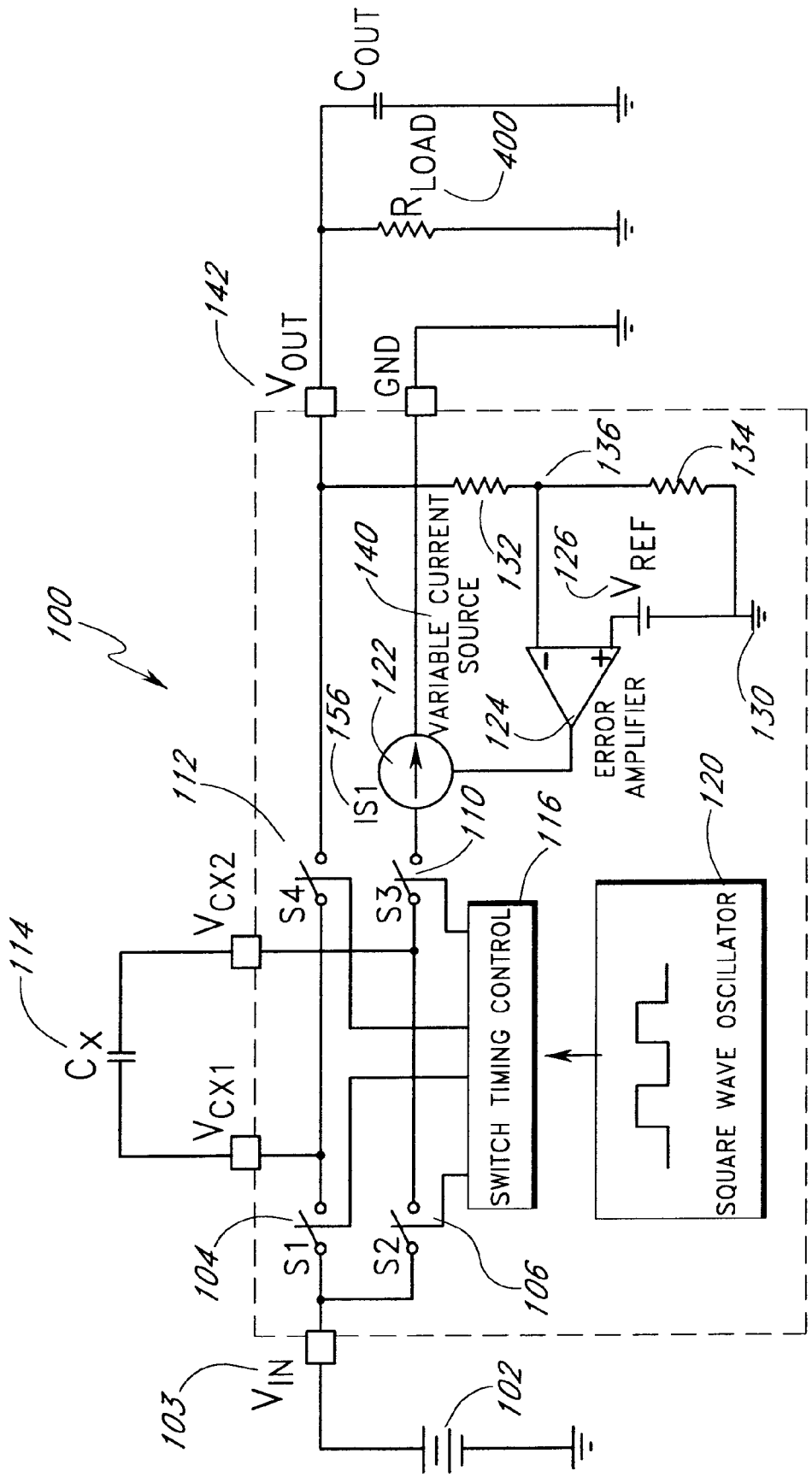
FIG. 4 is a circuit diagram of one embodiment of a regulated buck/boost charge pump of the present invention.

FIG. 4 illustrates one embodiment of a regulating charge pump 100 in accordance with the present invention. The regulating charge pump 100 receives electrical power from a primary power source 102 and provides a regulated output in a manner that will be described in greater detail below. In certain embodiments, the power source 102 comprises single-cell Lithium-ion or 3-cell Nickel-Cadmium (NiCad) batteries of types well known in the art. The power source 102, in one embodiment, provides input power on a terminal 103 at a voltage $V_{in}$ that varies from approximately 5.6V at full charge to approximately 3.0V at cutoff.

The regulating charge pump 100 also comprises semiconductor switches (S1) 104, (S2) 106, (S3) 110 and (S4) 112. The switches 104 and 106 have respective first terminals that are connected to the power source 102. A second terminal of the switch 104 is connected to a first terminal of the switch 112. A second terminal of the switch 112 is connected to an output terminal 142 that provides an output voltage, $V_{OUT}$. The second terminal of the switch 112 is also connected to a first terminal of a resistor 132. A second terminal of the switch 106 is connected to a first terminal of the switch 110. A second terminal of the switch 110 is connected to a variable current source 122, discussed below.

The regulating charge pump 100 also comprises a charge storage device $C_x$ 114 that is connected between a node $V_{CX1}$ and a node $V_{CX2}$. The node $V_{CX1}$ is connected to the second terminal of the switch 104 and to the first terminal of the switch 112. The node $V_{CX2}$ is connected to the second terminal of the switch 106 and to the first terminal of the switch 104. In one embodiment, the charge storage device $C_x$ 114 comprises a non-polarized capacitor of 1 μF of a type well known in the art. As discussed above in connection with FIGS. 1–3, the charge storage device $C_x$ 114 of FIG. 4 temporarily stores an electrical charge to enable the regulating charge pump 100 to deliver an output $V_{out}$ on the node 142 in a manner that will be described in greater detail below.

The regulating charge pump 100 also comprises a switch timing control circuit 116. The switch timing control circuit 116 generates timing signals T1 172 and T2 174 (illustrated in FIGS. 7 and 8) to control the switching of the switches 104, 106, 110, and 112 in a manner that will be described in greater detail below. In a preferred embodiment described herein, the switch timing control circuit 116 controls the switches 104 and 110 to operate in concert as a first pair of switches and controls the switches 106 and 112 to operate in concert as a second pair of switches. In particular, the switches 104 and 110 are closed and opened together, and the switches 106 and 112 are closed and opened together. As discussed above, the complementary closing and opening of the switches 104 and 110 with respect to the switches 106 and 112 is regulated by the switch timing control circuit 116 such that the switches 104 and 110 open completely before the switches 106 and 112 are closed and such that the switches 106 and 112 open completely before the switches 104 and 110 are closed to thereby prevent both pairs of switches from being closed simultaneously.

The regulating charge pump 100 also comprises a conventional square-wave oscillator 120. In the preferred embodiment, the square-wave oscillator 120 generates a square-wave signal F_In 170 (FIG. 7) that has a frequency of approximately 500 kHz. The square-wave oscillator 120 provides a timing clock to the switch timing control circuit 116. The switch timing control circuit 116 generates the T1 control signal 172 and the T2 control signal 174 in synchronism with the timing clock to provide the timing control signals for the opening and closing of the switch pairs 104 and 110 and 106 and 112.

Figure 7:
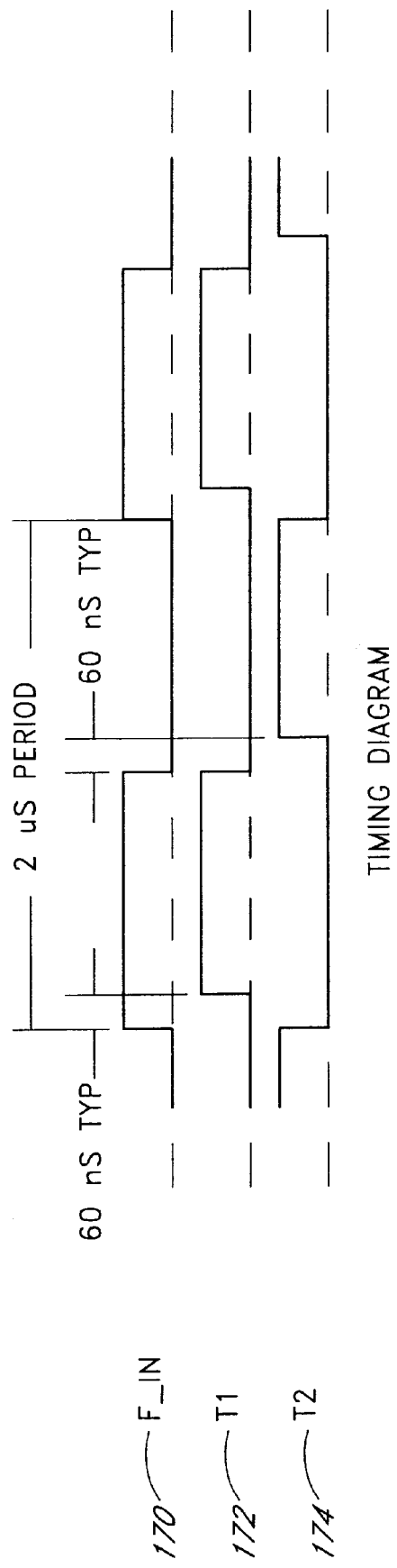
FIG. 7 is a timing diagram of one embodiment of a switch timing control.

As shown in FIG. 7 for the preferred embodiment, the T1 signal 172 is substantially in phase with the F_In signal 170; however, the rising edge of the T1 signal 172 lags the rising edge of the F_In signal 170 by approximately 60 nanoseconds. The falling edge of the T1 signal 172 occurs substantially synchronously with the falling edge of the F_In signal 170. The T2 signal 174 is substantially 180° out of phase with the F_In signal 170 such that the rising edge of the F_In signal 170 occurs synchronously with the falling edge of the T2 signal 174. The rising edge of the T2 signal 174 lags the falling edge of the F_In signal 170 by approximately 60 nanoseconds. Thus, both the T1 signal 172 and the T2 signal 174 are high for alternating 940-nanosecond periods at a frequency of approximately 500 kHz with 60-nanosecond null periods interposed between the active periods of the T1 signal 172 and the T2 signal 174. Thus, the switch pairs 104, 110 and 106, 112 are closed for alternating 940-nanosecond periods with 60 nanoseconds of dead time between each closed period.

Figure 8:
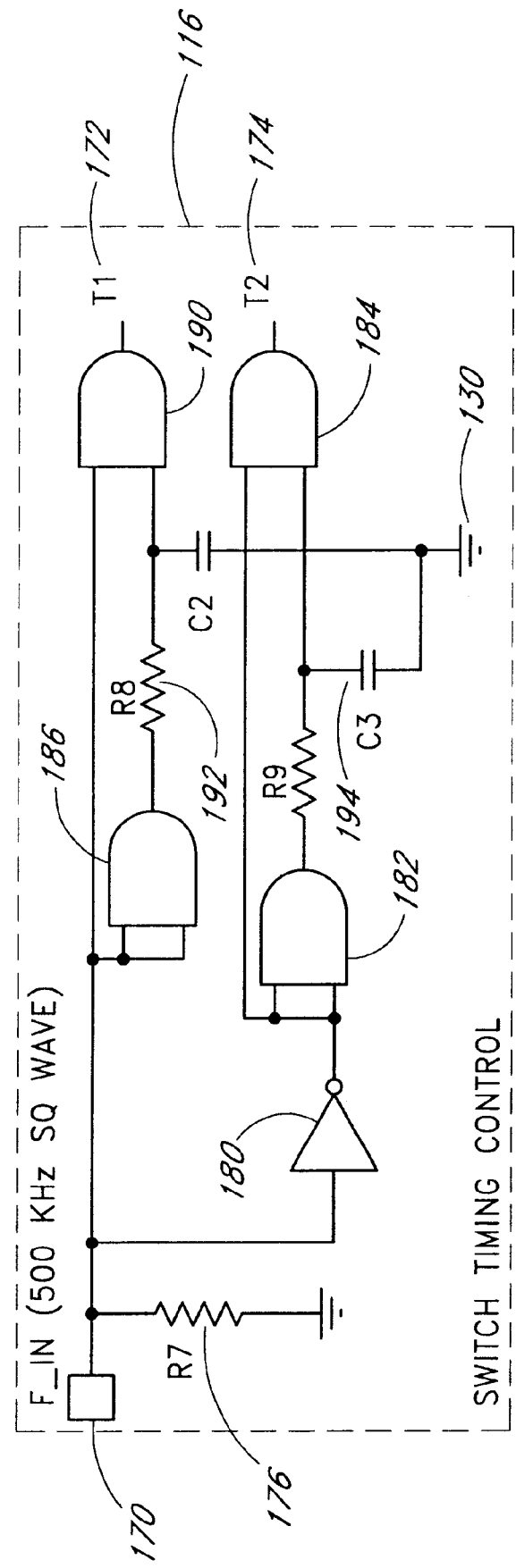
FIG. 8 is a circuit diagram of one embodiment of a switch timing control.

FIG. 8 is a circuit diagram of one embodiment of the switch timing control circuit 116. The switch timing control circuit 116 receives the F_In signal 170 on an input terminal, as previously described. A 50 Ω resistor R7 176 is connected between the input terminal and circuit ground 130. The F_In signal 170 is also coupled to the input of an inverter 180. The output of the inverter 180 is connected to both inputs of an AND gate 182 and to a first input of an AND gate 184. The output of the AND gate 182 is connected to a second input of the AND gate 184 with a delay circuit 194 interposed therebetween. The delay circuit 194 of this embodiment comprises a resistor R9 connected between the output of the AND gate 182 and the second input of the AND gate 184 and a capacitor C3 connected between the second input of the AND gate 184 and the circuit ground. The component values of the delay circuit 194 are selected to provide a 60-nanosecond delay between the output of the inverter 180 and the second input of the AND gate 184. The output of the AND gate 184 generates the T2 signal 174. Thus, a rising edge of the F_In signal 170 causes an immediate falling edge of the T2 signal 174. A falling edge of the F_In signal 170 causes a rising edge of the T2 signal 174 after a delay of approximately 60 nanoseconds.

The switch timing control circuit 116 of this embodiment also comprises an AND gate 186 having both inputs connected directly to the input terminal to receive the F_In signal 170. The F_In signal 170 is also connected to a first input of an AND gate 190. A delay circuit 192, comprising a resistor R8 and a capacitor C2, is also interposed between the output of the AND gate 186 and the second input of the AND gate 190 in a comparable manner to that previously described with respect to the delay circuit 194. The output of the AND gate 190 generates the T1 signal 172. A falling edge of the F_In signal 170 causes an immediate falling edge of the T1 signal 172 on the output of the AND gate 190. A rising edge of the F_In signal 170 causes a rising edge of the T1 signal 172 after a delay of approximately 60 nanoseconds through the delay circuit 194.

In the illustrated embodiment of the switch timing control circuit 116, the inverter 180 is advantageously a type 74ACT11240 integrated circuit, and each AND gate 182, 184, 186, 190 is advantageously a type 74ACT08 integrated circuit. In this embodiment, the delay circuits 192, 194 each comprise a 200% resistor and a 200 pF capacitor. It will be appreciated that other component values and types can be incorporated for alternative embodiments without detracting from the spirit of the present invention as described in this embodiment.

As further illustrated in FIG. 4, the regulating charge pump 100 also comprises a variable current source 122. The variable current source 122 is connected to the second terminal of the switch 110 to selectively provide a regulated current IS1 156 to the charge storage component, $C_x$, 114 in a manner that will be described in greater detail below. The variable current source 122 in this embodiment is capable of sourcing or sinking the regulated current IS1 156 at a magnitude up to approximately 100 mA.

The regulating charge pump 100 also comprises an error amplifier 124. The amplifier 124 is connected to the variable current source 122 to regulate the current supplied by the variable current source 122 to the charge storage component 114 via switch 110 in response to a feedback signal from the output voltage generated by the regulating charge pump 100. In this embodiment, the amplifier 124 is an operational amplifier (OpAmp) of a type well known in the art.

A voltage reference 126 is connected between the non-inverting input of the amplifier 124 and the circuit ground 130. In this embodiment, the voltage reference 126 provides a fixed 1.0 volt DC signal. In alternative embodiments, the voltage reference 126 provides a variable signal. For example, the voltage reference 126 is advantageously selectable among a plurality of fixed values.

The regulating charge pump 100 also comprises a resistor (R1) 132 and a resistor (R2) 134. As discussed above, the first terminal of the resistor 132 is connected to the second terminal of the switch 112. A second terminal of the resistor 132 is connected to the inverting input of the amplifier 124 and also to a first terminal of the resistor 134. The second terminal of the resistor 134 is connected to the circuit ground 130. In this embodiment, the resistor 132 has a value of approximately 230 kΩ and the resistor 134 has a value of approximately 100 kΩ.

The resistors 132 and 134 form a voltage divider 136 between the second terminal of the switch 112 and the circuit ground 130, wherein the common connection between the two resistors is a voltage division node that is connected to the inverting input of the amplifier 124. The amplifier 124, the voltage reference 126, and the voltage divider 136 form a feedback circuit 140. The feedback circuit 140 provides control inputs to the variable current source 122 in response to the voltage at the second terminal of the switch 112.

The voltage at the second terminal of the switch 112 is also the output voltage, $V_{OUT}$ on the node 142. The output voltage $V_{OUT}$ on the node 142 is provided to a load 400. In this embodiment, the load 400 comprises a resistive component in parallel with a capacitive component. The resistive component of the load has a resistance of approximately 44 Ω, and the capacitive component of the load has a capacitance of approximately 100 μF.

With the component values previously described for this embodiment, a $V_{OUT}$ of 3.3 volts on the node 142 generates a voltage at the voltage dividing node of the voltage divider 136 and thus at the inverting input of the amplifier 124 of approximately 3.3×(100/(100+230)) volts=1 volt, which is the same value of the voltage reference 126 as provided to the non-inverting input of the amplifier 124. Thus, it will be appreciated that a $V_{OUT}$ of 3.3 volts on the terminal 142 will generate a minimal feedback signal from the feedback circuit 140 and thus induce a steady state current from the variable current source 122. When $V_{OUT}$ on the terminal 142 is not equal to 3.3 volts, the feedback circuit 140 will source or sink a regulated current IS1 to attempt to return the voltage $V_{OUT}$ on the terminal 142 to 3.3 volts in a manner that will be described in greater detail below.

The regulated charge pump 100 may be considered to include a simulated variable battery ($C_x$) that can assume any DC voltage from $+V_{IN}$ to $-V_{IN}$. The simulated battery can be alternately connected in parallel or in series with the power source 102. When in series, the simulated battery supplies current to the load along with the power source 102. When in parallel, the simulated battery is recharged. The absolute value and polarity of the DC voltage across $C_x$ is determined by the magnitudes of the input and output voltages so that the following equations are met:

$$V_{OUT}=V_{IN}+V_{CX}$$

$$V_{CX}=V_{OUT}-V_{IN}$$

In one embodiment, with $V_{OUT}$=3.3 volts and $V_{IN}$=3.0 volts, then $V_{Cx}$=+0.3 volts (i.e., $V_{Cx1}=V_{Cx2}$+0.3 volts).

If $V_{OUT}$=3.3 volts and $V_{IN}$=6.0 volts, then $V_{Cx}$=−2.7 volts (i.e., $V_{Cx1}=V_{Cx2}$−2.7 volts).

The dynamics of this simulated battery voltage are defined by the following equations:

$$Q=I \times T=CV$$

$$V=I \times T/C$$

where Q is the charge in Coulombs, I is current in amperes, T is time in seconds, C is the value of $C_x$ in Farads, and V is the voltage across $C_x$. If the incremental charge and discharge currents in $C_x$ are relatively small and if $C_x$ is relatively large, the incremental or ripple voltage on $C_x$ will be small. This condition makes the simulated battery look very much like an actual battery.

Under steady-state operation, where the average values of $V_{in}$, $V_{out}$ and current in the load do not change, the charging current to $C_x$ must equal its discharging current in order to maintain a constant DC voltage across $C_x$. In this simulated battery, if the average charge current over many pump cycles exceeds the discharge current, a positive voltage ($V_{Cx1} > V_{Cx2}$) will develop across $C_x$. On the other hand, if average discharge current is greater, a negative voltage results ($V_{Cx1} < V_{Cx2}$). The feedback circuit 140, as shown in FIG. 4, forces an imbalance of current in the charge storage component, $C_x$, 114 to adjust its steady-state voltage whenever input voltage or load current changes.

Also, since the charge current in $C_x$ has a maximum value determined by design, and since $I_{OUT}$ cannot exceed $I_{IN}$ in this topology (under steady-state conditions), the output is automatically short circuit current limited.

Figure 5:
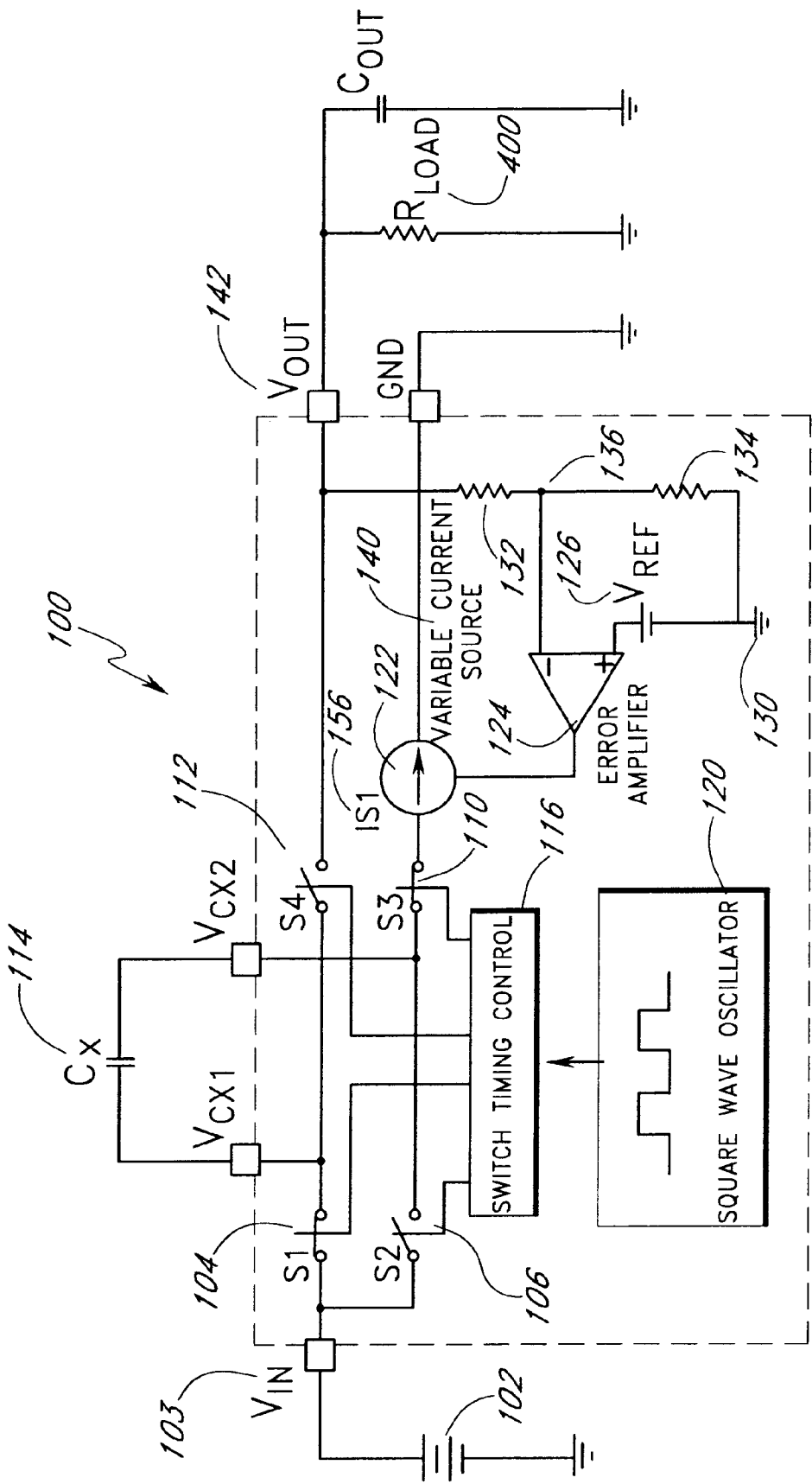
FIG. 5 is an equivalent circuit diagram of the regulated charge pump of FIG. 4 during a charge half-cycle.

FIG. 5 is an equivalent circuit diagram of one embodiment of the regulating charge pump 100 during start-up conditions. For illustration purposes, the initial conditions are assumed to be:

$V_{IN} = V_{OUT} = V_{Cx} = 0$ volts $C_{out} = 100$ μF $Cx = 1$ μF $Fosc = 500$ kHz $V_{out}$ is set to regulate to 3.3 volts into a 44-ohm load.

$IS1 \leq 100$ mA (maximum).

Resistance of each switch 104, 106, 110, and 112=5 ohms

At power on in this embodiment, $V_{IN} = 6.0$ V. When the oscillator 120 starts, the arbitrary assumption will be made that the odd switch pair 104 and 110 will close first as shown in FIG. 5. This places the charge storage component $C_x$ in series with the power source 102 and the variable current source 122. Thus, a direct current will be provided by the power source 102 to the charge storage component $C_x$. This current will flow to cause the charge storage component $C_x$ to gain a small positive voltage. Since $V_{OUT} = 0$ volts at startup, the voltage at the voltage division node 136 of the feedback circuit 140 is also 0 volts. Thus, the feedback loop 140 is unsatisfied, and the output of the variable current source 122 will seek its maximum value, which in this embodiment is approximately 100 mA. The circuit values will be defined by the equation:

$$\Delta VCx_1 = I \times t / C$$

which in this embodiment will give values of $$\Delta VCx_1 = 100 \text{ mA} \times 1 \text{ μs}/1 \text{ μF} = +100 \text{ mV}$$

Figure 6:
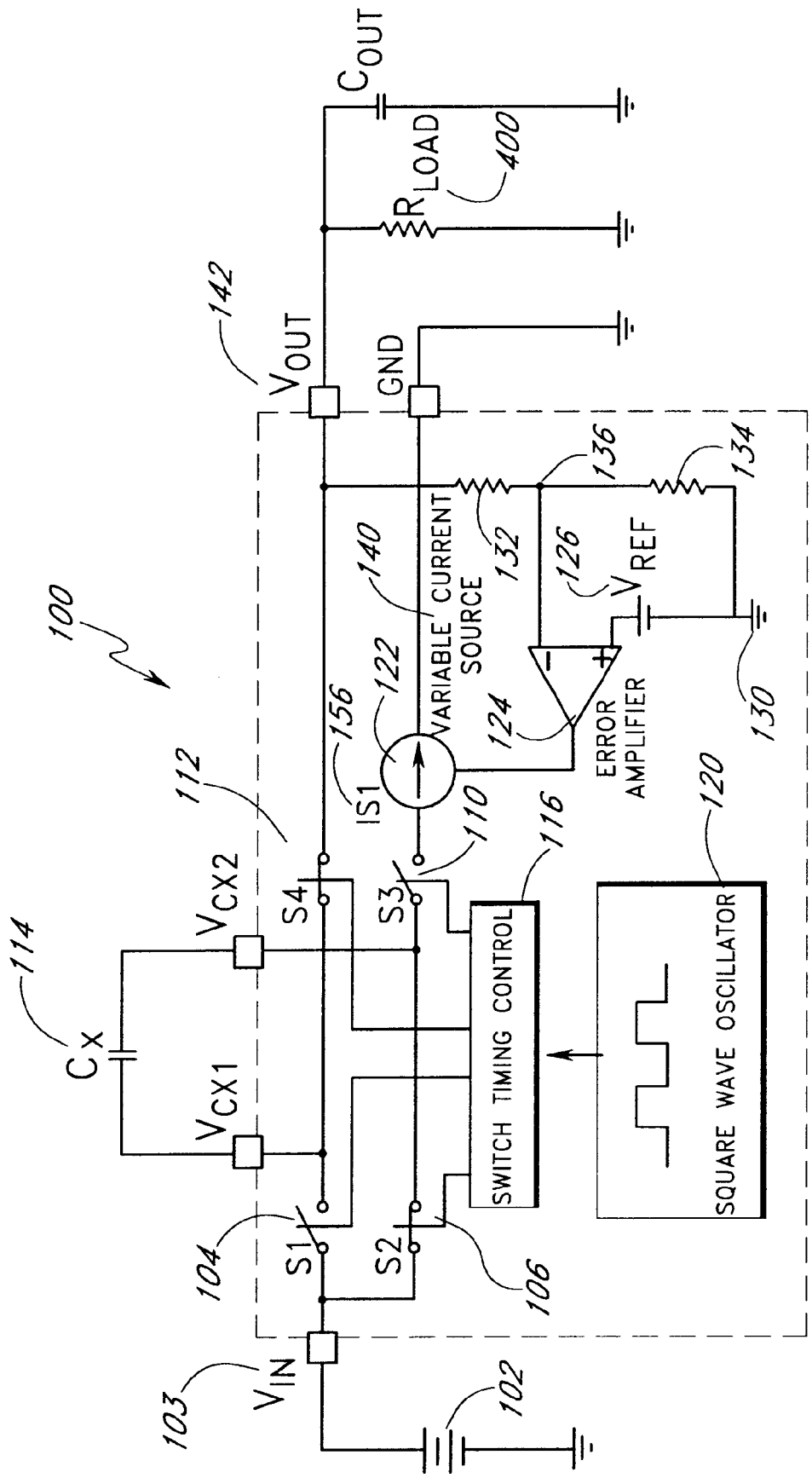
FIG. 6 is an equivalent circuit diagram of the regulated charge pump of FIG. 4 during a discharge half-cycle.

FIG. 6 illustrates a subsequent clock cycle, wherein the charge storage component $C_x$ 114 is connected in series with the power source 102 and the load 400 via the closed switch pair 106 and 112. Only the switch 106 and the switch 112 on resistances (approximately 5 Ω each in this embodiment) and the load 400 impedance limit discharge current. The impedance of the load 400 is negligible under transient conditions because of the relatively high capacitance (100 μF) of $C_{OUT}$. The circuit values will be defined by the equations:

$$\Delta VCx_2 = i \times t / C, \quad i = V / R \times e^{-t/rc}$$

$$\Delta VCx_2 = ((V_{IN} + V_{Cx} - V_{OUT}) / 2R_{switch}) \times (e^{-t/rc}) \times (t/C)$$

In this embodiment, the corresponding component values will produce:

$$\Delta VCx_2 \approx ((6 + 0.1 - 0)/10 \text{ Ω}) \times e^{-1 \text{ μS}/10 \text{ Ω} \times 1 \text{ μF}} (1 \text{ μS}/1 \text{ μF})$$

$$\approx 0.61 \text{ volts} \times 0.95 \approx 0.580 \text{ volts}$$

Since discharge current in the charge storage component $C_x$ 114 during the second half cycle (FIG. 6) flows in the opposite direction to the charge current in the first half cycle (FIG. 5), the voltage developed across the charge storage component $C_x$ 114 in the second half cycle is negative with respect to the first half cycle. Therefore, the new value for $V_{Cx}$ is:

$$V_{Cx}(new) = V_{Cx1} + V_{Cx2} = +0.1 - 0.580 = -0.480 \text{ volts}$$

In subsequent cycles $V_{out}$ on the terminal 142 will rise exponentially toward 3.3 volts while $V_{Cx}$ charges to −2.7 volts DC. When equilibrium is reached, $V_{OUT}$ will be approximately 3.3V, $V_{IN}$ will be approximately 6 volts and $V_{Cx}$ will be approximately −2.7V. The current supplied to the load 400 under steady-state conditions is 3.3 volts/44 Ω=75 mA. The charge and discharge currents for the charge storage component $C_x$ 114 are also 75 mA average (150 mA peak), and the current $I_{IN}$ delivered by the power source 102 is 150 mA average. The peak-to-peak ripple voltage across $V_{Cx}$, assuming an equivalent series resistance (ESR) of $C_x$ is negligible, is 75 mA×1 μS/1 μF=75 mV.

From an efficiency viewpoint, the foregoing example is nearly a worst case since both $I_{IN}$ and $V_{IN}$ are larger than $I_{OUT}$ and $V_{OUT}$. In this example:

$$Eff = POUT/PIN = 3.3 \times 0.075/6 \times 0.150$$

$$= 27.5\%, \text{ excluding FET resistive losses.}$$

A similar example can be made for the case where $V_{IN}$ is 3.0V. In this case, $C_x$ will also initially charge in a negative direction, but will become zero when $V_{OUT}$ reaches $V_{IN}$, and will finally change to +0.3V.

Figure 9:
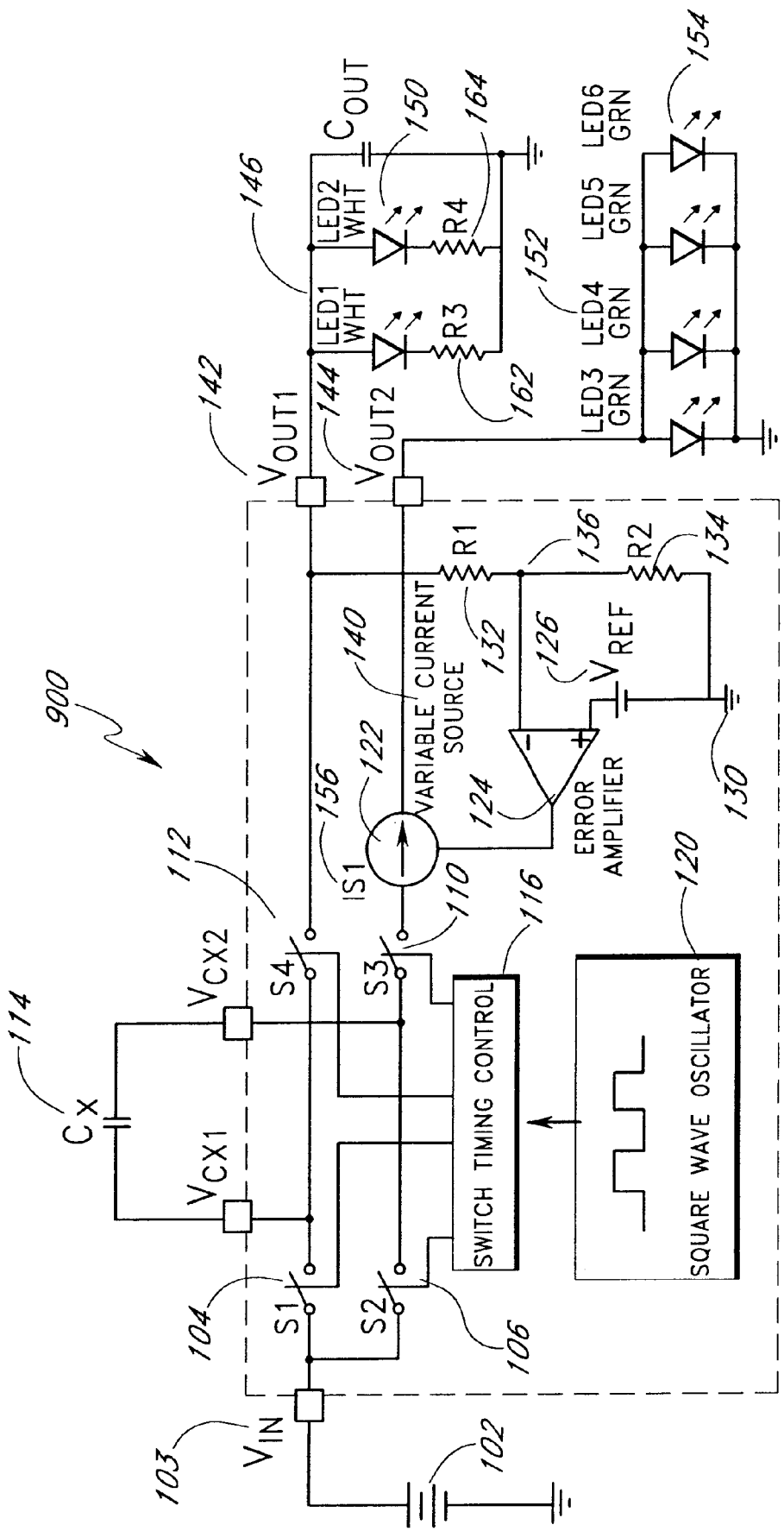
FIG. 9 is a circuit diagram of one embodiment of a multiple output charge pump.

FIG. 9 is a circuit diagram of one embodiment of a multiple output regulating charge pump 900 (e.g., a dual output charge pump). In one embodiment, the dual output charge pump 900 is the charge pump shown in FIG. 4 with a second load 152 interposed between the variable current source 122 and circuit ground 130. The dual output charge pump 900 receives electrical power from a primary power source 102. In this embodiment, the charge pump 900 provides a first regulated output $V_{OUT1}$ on the terminal 142 and provides a second regulated output $V_{OUT2}$ on a terminal 144 in a manner that will be described in greater detail below.

In the embodiment of FIG. 9, $V_{OUT1}$ on the terminal 142 is regulated at approximately 3.9 volts. $V_{OUT1}$ is provided to a first load 146. The first load 146 advantageously comprises a capacitive component of approximately 10 μF in parallel with a plurality of white light emitting diodes (LEDs) 150, with each LED 150 in series with a respective resistor (R3) 162 and (R4) 164.

The second output voltage $V_{OUT2}$ on the terminal 144 is provided to a second load 152. In this embodiment, $V_{OUT2}$ is regulated to provide approximately 40 mA of current to the second load 152. In the embodiment of FIG. 9, $V_{OUT2}$ is the voltage present at the sink pole of the variable current source 122. The second load 152 comprises a plurality of green LEDs 154 connected in parallel between the terminal 144 and circuit ground 130 so that the voltage $V_{OUT2}$ appears across each green LED.

In the embodiment of FIG. 9, the second load 152 is interposed between the variable current source 122 and circuit ground 130. The regulated current 156 flowing from the variable current source 122 is provided to the second load 152 at a voltage determined by the difference between the voltage $V_{IN}$ developed by the power source 102 and the steady-state charge on the charge storage component 114.

As discussed above in connection with the charge pump 100 in FIG. 5, the regulated charge pump 900 in FIG. 9 may also be considered as including a simulated variable battery ($C_x$) that can assume any DC voltage from $+V_{IN}$ to $-V_{IN}$. The simulated battery can be alternately connected in series with the power source 102 and the first load 146 or with the second load 152. When in series with the first load 146, it supplies current to the first load 146 along with the power source 102. When in series with the second load 152, it is recharged. The absolute value and polarity of DC voltage across $C_x$ is determined by the magnitudes of the input and output voltages so that the following equations are met:

$$V_{OUT1}=V_{IN}+V_{CX}$$

$$V_{CX}=V_{OUT1}-V_{IN}$$

In one embodiment, with $V_{OUT}$=3.9 volts and $V_{IN}$=3.0 volts, then $V_{Cx}$=+0.9 volts (i.e., $V_{Cx1}=V_{Cx2}$+0.9 volts).

If $V_{OUT}$=3.9 volts and $V_{IN}$=5.6 volts, then $V_{Cx}$=−1.7 volts (i.e., $V_{Cx1}=V_{Cx2}$−1.7 volts).

Figure 10:
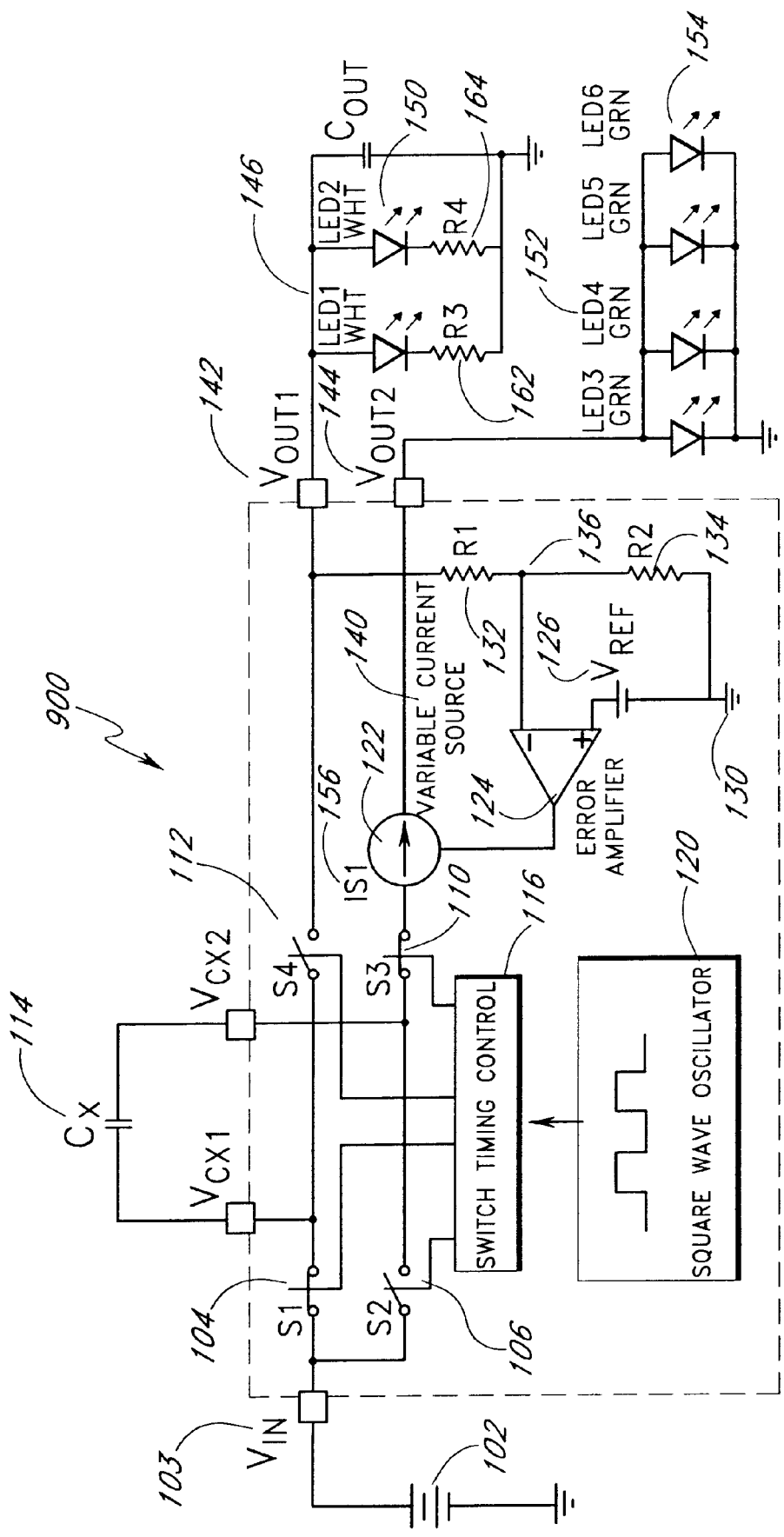
FIG. 10 is an equivalent circuit of the multiple output charge pump of FIG. 9 during a charge half-cycle.

FIG. 10 is an equivalent circuit of the dual output charge pump 900 of FIG. 9 during a charge half-cycle, wherein current is supplied to the second load 152. In this embodiment, $V_{IN}$=3.0 volts, and the arbitrary assumption is made that the odd switches 104 and 110 are closed. This places the charge storage component $C_x$ 114 in series with the power source 102, the variable current source 122, and the second load 152. To maintain $V_{OUT1}$ on the terminal 142 at 3.9 volts with $V_{IN}$ on the terminal 103 at 3.0 volts, a voltage of 0.9 volts is required across the charge storage component 114. The difference of 2.1 volts is available at the $V_{OUT2}$ terminal 144. Thus, a regulated direct current 156 is provided by the power source 102 to the charge storage component $C_x$ 114 through the variable current source 122 and to the second load 152 at 2.1 volts.

In the embodiment of FIG. 10, each of the four green LEDs 154 draws 10 mA of current thus requiring a total regulated current (IS 156) of 40 mA. This current also causes the voltage across the charge storage component $C_x$ 114 to increase by 0.9 volts. The output voltage $V_{OUT2}$ available at the terminal 144 has a magnitude of 2.1 volts, which is within the optimal range to power the green LEDs 154.

Figure 11:
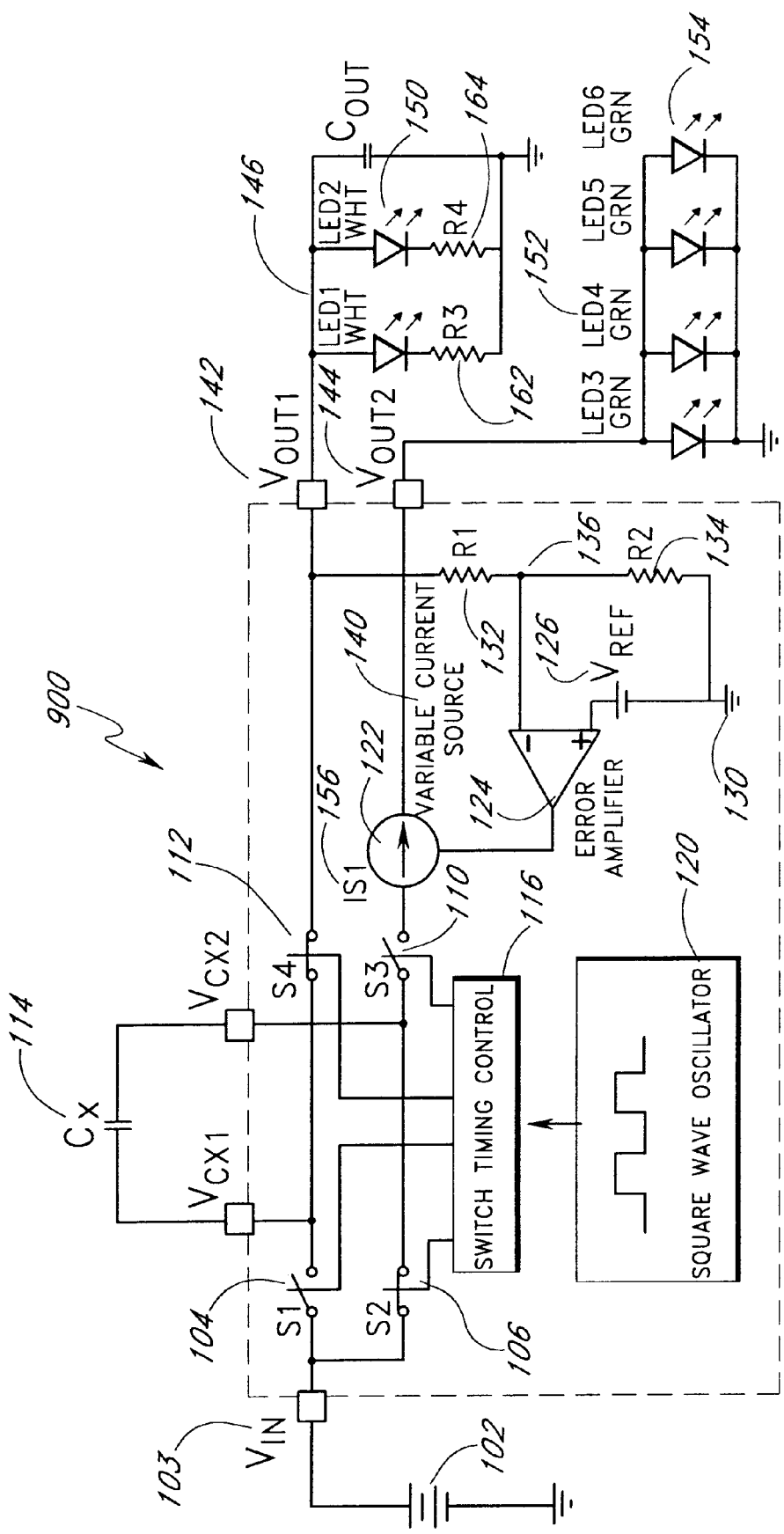
FIG. 11 is an equivalent circuit diagram of the multiple output charge pump of FIG. 9 during a discharge half-cycle.

FIG. 11 is an equivalent circuit diagram of the dual output charge pump 900 of FIG. 9 during a discharge half-cycle, wherein the charge storage component $C_x$ 114 is connected in series with the power source 102 and the first load 146 via the closed switch pair 106 and 112. In this condition, the power source 102 provides current through the charge storage component 114, which adds 0.9V to $V_{IN}$ and provides the total voltage as the output voltage $V_{OUT1}$ to the first load 146 via the terminal 142. In the embodiment of FIG. 11, each white LED 150 draws 20 mA for a total regulated current of 40 mA from the terminal 142.

The embodiment of the multiple output regulated charge pump 900 described herein is particularly advantageous because the currents required for operation of the first load 146 and the second load 152 are substantially identical. Also, in the application of cell phones, PDAs, and the like, both the white LEDs 150 of the first load 146 and the green LEDs 154 of the second load 152 are normally on at the same time. It will be appreciated that to a user of the device, sequentially turning on the white 150 and green LEDs 154 for 1 μs periods at 500 kHz will appear to be a seamless, continuous operation.

The overall system level efficiency, defined here as the power dissipated in the LEDs 150, 154 neglecting loses in the ballast resistors 162, 164 and neglecting switch loses at the minimum input voltage level $V_{IN}$ of 3.0 volts from the power source 102 is defined by:

$$Eff=Pout/Pin=(Pwhite+Pgreen)/Pin$$

$$Pout=3.6\ V\times40\ mA+2.0\ V\times40\ mA=224\ mW$$

$$Pin=Vin\times2Iout=3.0\ V\times80\ mA=240\ mW$$

Therefore, $$Eff=224/240=93.3\%\ \text{(Theoretical maximum)}.$$

The actual realized efficiency will be about 84% after accounting for losses on the charge storage component 114 and the resistances of the switches 104, 106, 110, and 112.

This efficiency of the regulating charge pump 900 of FIG. 9 can be compared to the case where a comparable array of green and white LEDs are driven directly from a battery with two linear current source circuits where:

$$Pin=(V_{IN}\times2I_{OUT\_WHT})+(V_{BAT}\times I_{GREEN})240+120\ 360\ mW$$

$$Eff\ 224/360=62.2\%\ \text{(Theoretical Maximum)}$$

The actual efficiency of the green driver is approximately 80/120=66.7%.

The actual efficiency of a separate white LED driver is about 0.9× calculated maximum:

$$Eff\ Wht=0.9\times(3.6\times0.04/3.0\times0.08)$$

$$=0.9\times(0.144/0.240)$$

$$=0.9(60\%)\approx54\%.$$

The overall combined efficiency of the two separate circuits is approximately 62%. In addition, this alternative to the present invention requires two separate circuits, whereas the multiple output regulated charge pump 900 of the embodiment in FIG. 9 offers improved efficiency in a single circuit. Thus, the efficiency from a system point of view is increased from approximately 62% to approximately 84% with the embodiment of FIG. 9, and a saving of approximately 120 mW is obtained. In other words, the total power usage of the LEDs 150, 154 drops from approximately 360 mW to approximately 240 mw. Thus, a savings of 120/360= 33.3% of total power of the LEDs is obtained. As previously discussed, reduced power consumption and improved efficiency is highly desirable in the art of battery-powered devices. The efficiency for alternative embodiments with different values of $V_{IN}$ are set forth in the following table.

Efficiency vs. Vin for a single multiple output regulated charge pump 900 vs. dual single output charge pumps with linear regulators.
Two White LEDs at 20 mA each, Four Green LEDs at 10 mA each

| Vin 103 | Pin | Pout | Efficiency of single output White LED charge pump A | Efficiency of Green LED linear regulator B | System Efficiency Of Single output pump + linear regulator A + B | Efficiency of multiple output regulated Charge Pump 100 |
|---|---|---|---|---|---|---|
| 3.2 V | 256 mW wht +128 mW grn | 144 mW wht +88 mW grn | 50.6% | 68.7% | 60.4% | 81.5% |
| 3.6 V | 288 mW | 144 mW | 45% | | 53.7% | 72.5% |

-continued

Efficiency vs. Vin for a single multiple output regulated charge pump 900 vs. dual single output charge pumps with linear regulators.
Two White LEDs at 20 mA each, Four Green LEDs at 10 mA each

| Vin 103 | Pin | Pout | Efficiency of single output White LED charge pump A | Efficiency of Green LED linear regulator B | System Efficiency Of Single output pump + linear regulator A + B | Efficiency of multiple output regulated Charge Pump 100 |
|---|---|---|---|---|---|---|
| 4.2 V | wht +144 mW grn 336 mW | wht +88 mW grn 144 mW | 61% 38.5% | — 46% | — 62.1% |  |
| 5.6 V | wht +168 mW grn 448 mW | wht +88 mW grn 144 mW | 52.3% 28.9% | — 34.5% | — 46.6% |  |
|  | wht +224 mW | wht +88 mW grn | 39.2% | — |  |  |

Figure 12:
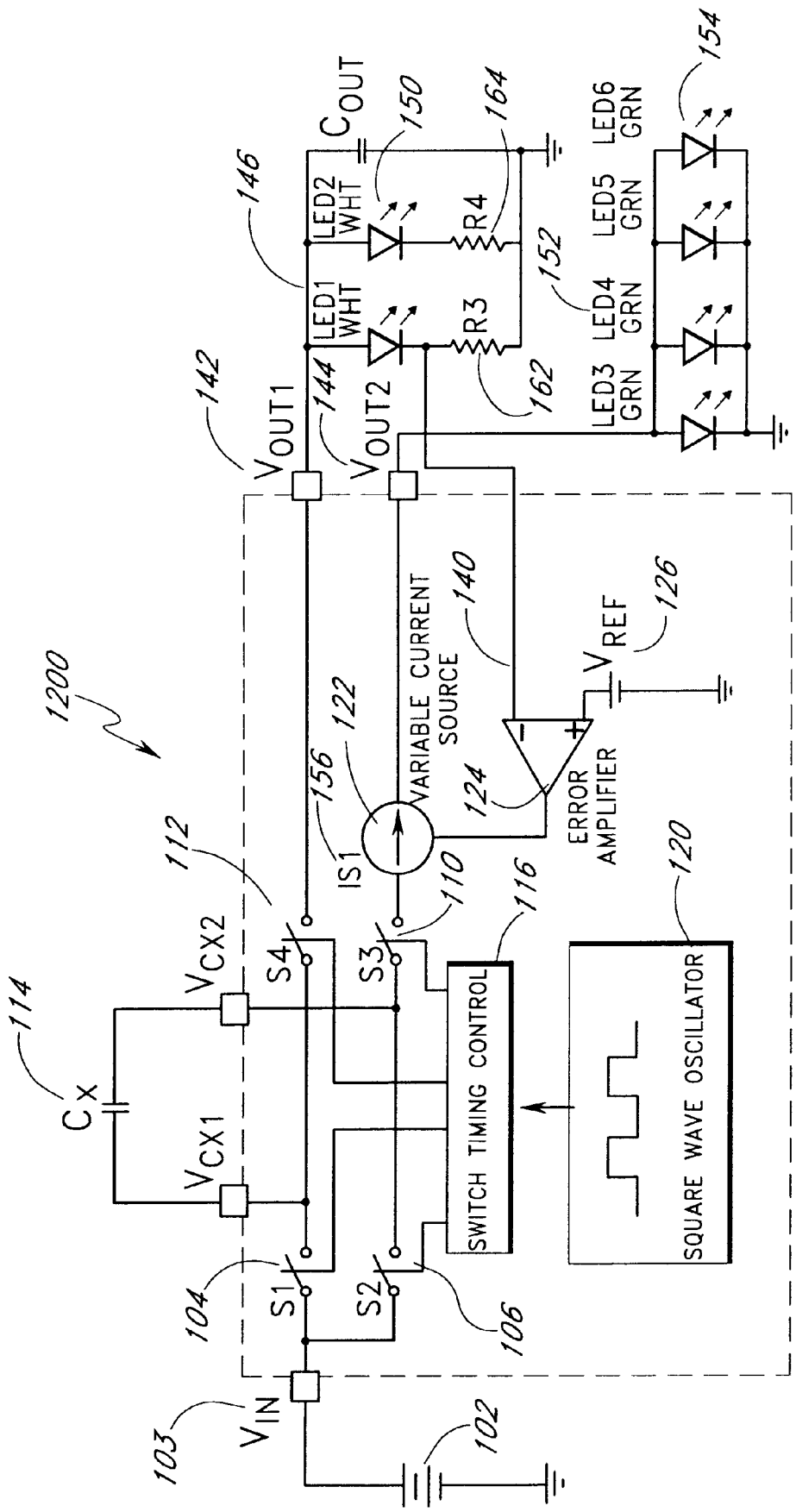
FIG. 12 is a circuit diagram of an alternate embodiment of a multiple output charge pump.

FIG. 12 is a circuit diagram of an alternative embodiment of a multiple output regulating charge pump 1200 that includes compensation for variations in a forward voltage drop $V_F$ of a white LED 150. The overall functionality and operation of the regulating charge pump 1200 is substantially similar to that of the regulating charge pump 900 described above. Attention will be drawn to the differences between the regulating charge pumps 900 and 1200. The components comprising the regulating charge pump 1200 and the operation thereof can be assumed to be otherwise substantially similar to that previously described with respect to the regulating charge pump 900.

The regulating charge pump 1200 eliminates the resistor (R1) 132 and the resistor (R2) 134. Instead, in the embodiment of FIG. 12, direct connection is made between the inverting input of the error amplifier 124 and the node between the resistor (R3) 162 and a first white LED 150.

The embodiment of FIG. 12 is advantageous because the sense signal for the feedback circuit 140 (i.e., the voltage present at the inverting input of the error amplifier 124) is derived from the "output" of the white LED 150 comprising the first load 146. In contrast, in FIG. 9, the sense signal is derived from the "input" of the white LED 150 comprising the first load 146. The white LEDs 150 have the forward voltage drop $V_F$ as is well known in the art. During use, the forward voltage drop $V_F$ can change as the temperatures and currents of the white LEDs 150 change. Thus, the embodiment of FIG. 12 more closely tracks the actual operating condition of the white LEDs 150 than is obtained by tracking the first output voltage $V_{OUT1}$ on the terminal 142 directly.

Figure 13:
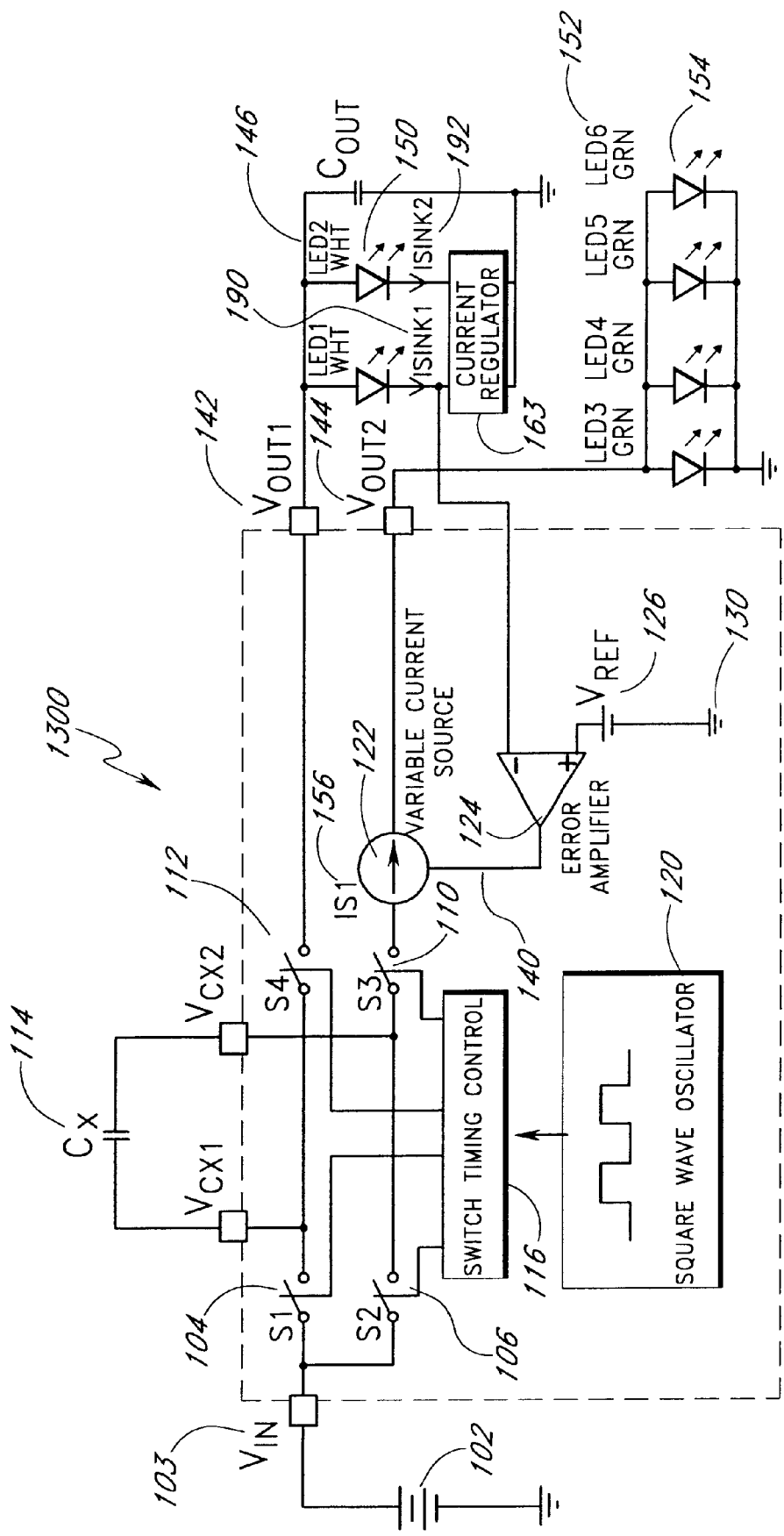
FIG. 13 is a circuit diagram of a charge pump with load current regulation.

FIG. 13 is a circuit diagram of a charge pump 1300 with load current regulation. The charge pump 1300 receives electrical power from a primary power source 102, and, in this embodiment, provides a first regulated output $V_{OUT1}$ on the terminal 142 and provides a second regulated output $V_{OUT2}$ on the terminal 144 in a manner that will be described in greater detail below. The overall functionality and operation of the regulating charge pump 1300 is substantially similar to that of the regulating charge pump 1200 as previously described. Attention will be drawn to the differences between the regulating charge pumps 1200 and 1300 and the components comprising the regulating charge pump 1300. The operation thereof can be assumed to be otherwise substantially similar to that previously described with respect to the regulating charge pump 1200.

Like the charge pump 1200, the regulating charge pump 1300 eliminates the current sensing resistor (R3) 162 and the current sensing resistor (R4) 164. Instead, in the embodiment of FIG. 13, an active load current regulator 163 replaces the current sensing resistors 162 and 164 for more efficient operation. The active load current regulator 163 causes a first sink current (ISINK1) 190 to flow through the first white LED 150 and causes a second sink current (ISINK2) 192 to flow through the second white LED 150.

Figure 14:
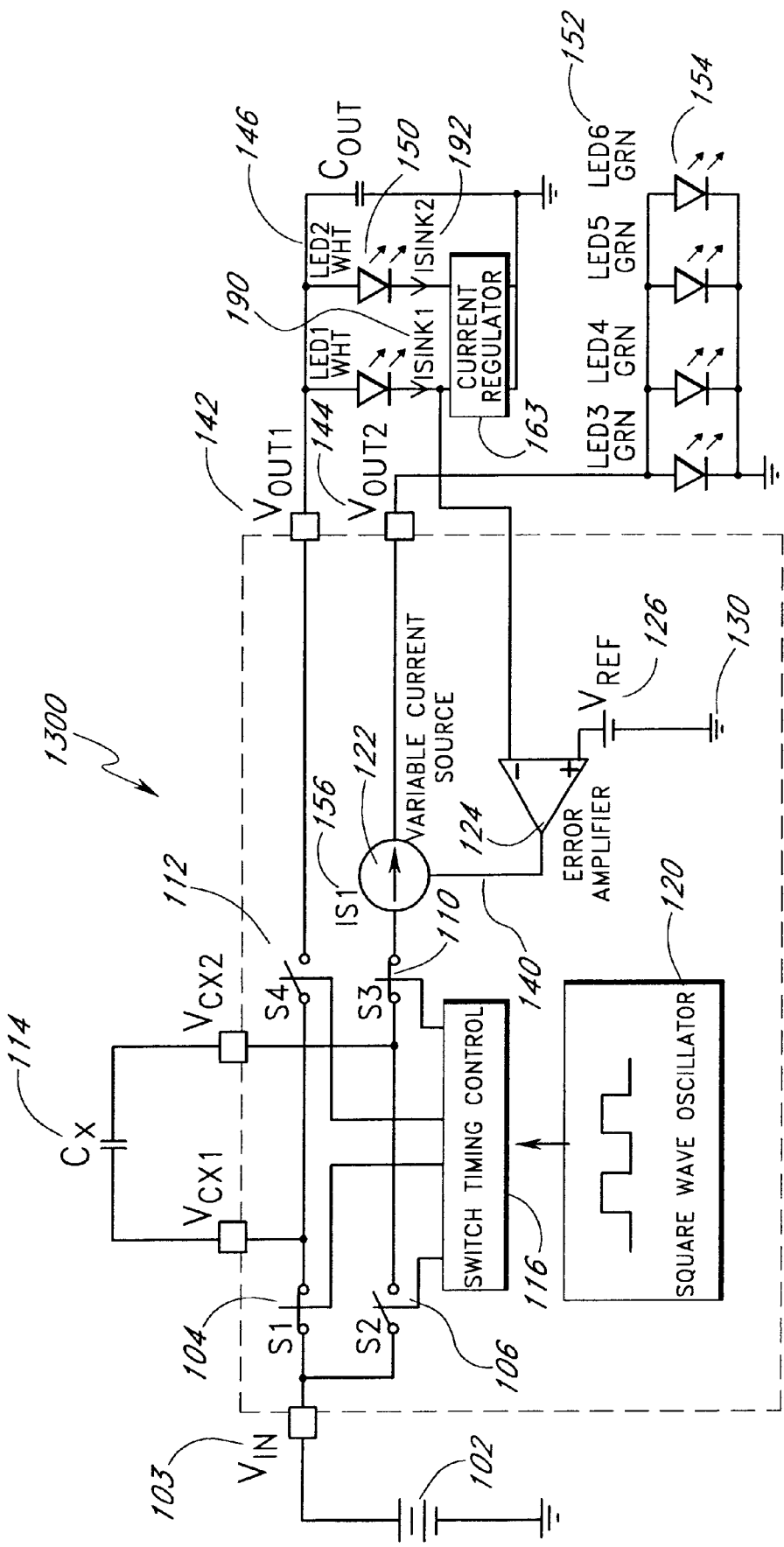
FIG. 14 is a circuit diagram of the charge pump with load current regulation of FIG. 13 during a charge half-cycle, providing power to a second load.

FIG. 14 is a circuit diagram of the charge pump 1300 with load current regulation of FIG. 13 during a charge half-cycle, during which the charge pump 1300 provides power to a second load 152. In this embodiment, $V_{IN}$=3.0 volts, and the arbitrary assumption is made that the switches 104 and 110 are closed. This places the charge storage component $C_x$ 114 in series with the power source 102, the variable current source 122, and the second load 152. To maintain $V_{OUT1}$ on the terminal 142 at 3.9 volts with $V_{IN}$=3.0 volts, a voltage of approximately 0.9 volts is required across the charge storage component 114. The 2.1 volt difference between $V_{IN}$ and the voltage across the charge storage component 114 is thus available at the $V_{OUT2}$ terminal 144. A regulated direct current 156 will be provided by the power source 102 to the charge storage component $C_x$ 114 through the variable current source 122 and to the second load 152 at 2.1V.

In the embodiment of FIGS. 13 and 14, each of the four green LEDs 154 draws 15 mA of current, which results in a total regulated current 156 of 60 mA. This current also causes voltage across the charge storage component $C_x$ 114 to increase by approximately 0.9V. The output voltage available at the $V_{OUT2}$ terminal 144 is approximately 2.1V and is within the optimal range to power the green LEDs 154.

Figure 15:
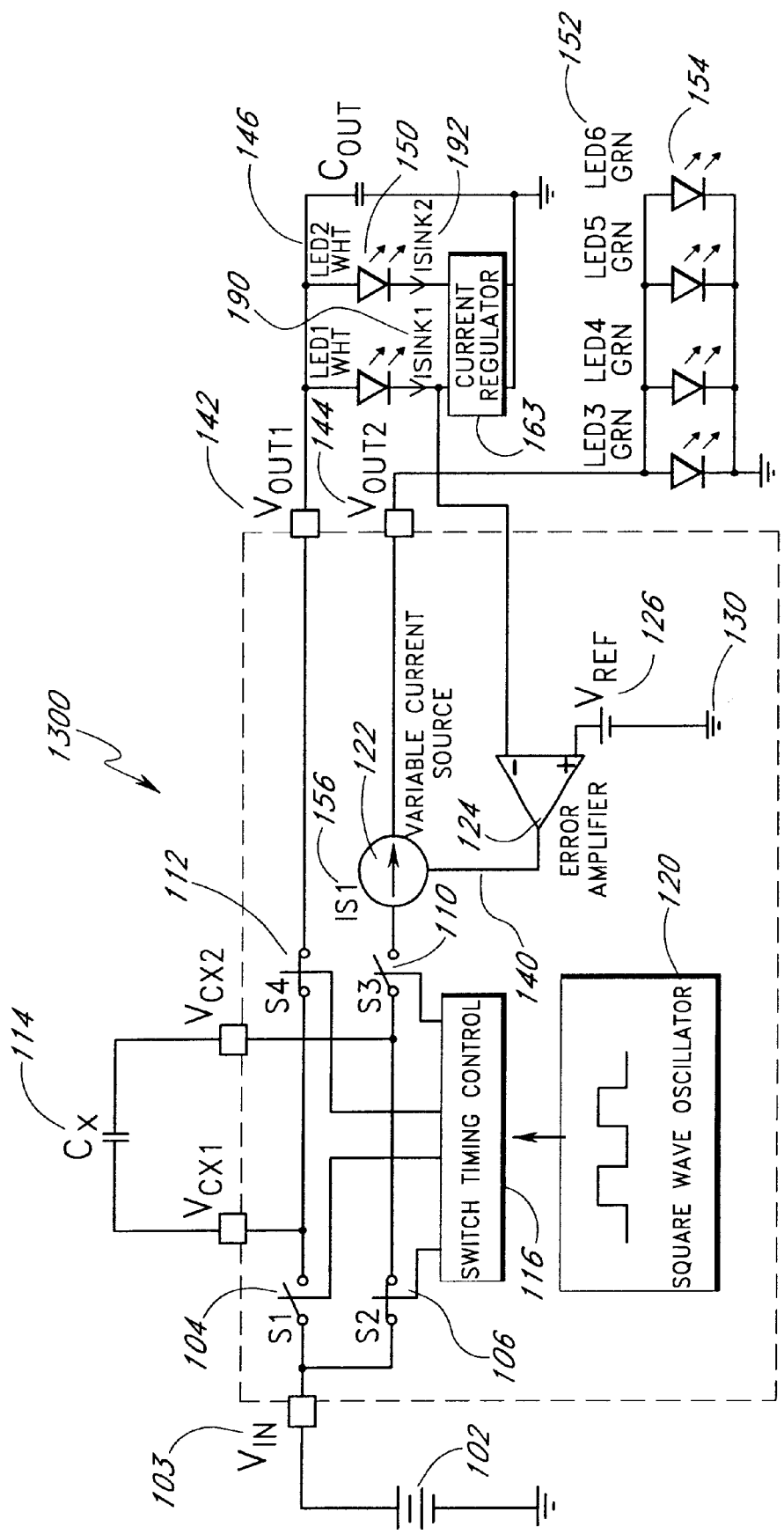
FIG. 15 is a circuit diagram of the charge pump with load current regulation of FIG. 15 during a discharge half-cycle providing regulated voltage and current to multiple branches of a first load.

FIG. 15 is a circuit diagram of the charge pump 1300 with load current regulation of FIG. 13 during a discharge half-cycle during which regulated voltage and current are provided to multiple branches of a first load 146. The charge storage component $C_x$ 114 is connected in series with the power source 102 and the first load 146 via the closed switch switches 106 and 112. In this condition, the power source 102 provides current through the charge storage component 114, which adds 0.9 volts to $V_{IN}$. The total voltage is applied to the first load 146 via the terminal 142. In this embodiment, each white LED 150 draws 30 mA of current for a total regulated current 156 of 60 mA.

The embodiment of the multiple output regulated charge pump 1300 described herein is particularly advantageous in that the currents required for operation of the first load 146 and the second load 152 are substantially identical. Also, in the application of cell phones, PDAs, and the like, both the white LEDs 150 of the first load 146 and the green LEDs 154 of the second load 152 are normally on at the same time. The 10 µF capacitive element connected in parallel with the two white LEDs 150 filters the current in the first load 146 such that the ISINK1 current 190 and the ISINK2 current 192 are substantially continuous. In alternative embodiments, the 10 µF capacitive element can be eliminated to allow the ISINK1 current 190 and the ISINK2 current 192 to pulse at 50% duty cycle and double amplitude; however, the light output of these embodiments will be less than the embodiment described above.

The overall system level efficiency, defined here as the power dissipated in the LEDs 150, 154 neglecting switch loses at the minimum $V_{IN}$ of 3.0 volts provided by the power source 102 is defined by:

$Eff=Pout/Pin=(Pwhite+Pgreen)/Pin$ $Pout=3.6\ V\times 60\ mA+2.0\ V\times 60\ mA=336\ mw$ $Pin=Vin\times 2\times Iout=3.0\ volts\times 120\ mA=360\ mw$ Therefore, $Eff=336/360=93.3\%$ (Theoretical maximum).

The actual realized efficiency will be about 84% after accounting for losses on the charge storage component 114 and the resistance of the switches 104, 106, 110, and 112.

This efficiency of the regulating charge pump 1300 of FIG. 13 can be compared to the case where a comparable array of green and white LEDs are driven directly from a battery with two linear current source circuits where:

$Pin=(V_{IN}\times 2\times I_{OUT\_WHT})+(V_{BAT}\times I_{OUT\_GRN})=360+180\ 540\ mw$ $Eff\ 336/540=62.2\%$ (Theoretical Maximum)

The actual efficiency of the green driver is 120/180= 66.7%.

The actual efficiency of a separate white LED driver is about 0.9× calculated maximum:

$Eff_{WHT}=0.9\times(3.6\times 0.06/3.0\times 0.12)$ $=0.9(0.216/0.360)$ $=0.9\times(60\%)\approx 54\%$ The overall combined efficiency of the two separate circuits is approximately 62%. In addition, this alternative to the present invention requires two separate circuits, whereas the multiple output regulated charge pump 1300 of this embodiment offers improved efficiency in a single circuit. Thus, the efficiency from a system point of view is increased from approximately 62% to approximately 84% with the embodiment of FIG. 13. A saving of approximately 180 mW is obtained. In other words, the total power usage of the LEDs 150, 154 drops from approximately 540 mW to approximately 360 mw. Thus, a savings of 180/540=33.3% of total power of the LEDs 150, 154 is obtained. As previously discussed, reduced power consumption and improved efficiency are highly desirable in the art. The efficiency for alternative embodiments with different values of $V_{IN}$ 103 are given in the following table.

Efficiency vs. Vin for a single multiple output regulated charge pump 1300 vs. dual single output charge pumps with linear regulators. Two White LEDs at 30 mA each, Four Green LEDs at 15 mA each

| Vin 103 | Pin | Pout | Efficiency of single output White LED charge pump A | Efficiency of Green LED linear regulator B | System Efficiency Of Single output pump + linear regulator A + B | Efficiency of multiple output regulated Charge Pump 1300 |
|---|---|---|---|---|---|---|
| 3.2 V | 384 mW wht +192 mW grn | 216 mW wht +132 mW grn | 50.6% | 68.7% | 60.4% | 81.5% |
| 3.6 V | 432 mW wht +216 mW grn | 216 mW wht +132 mW grn | 45% | 61% | 53.7% | 72.5% |
| 4.2 V | 504 mW wht +252 mW grn | 216 mW wht +132 mW grn | 38.5% | 52.3% | 46% | 62.1% |
| 5.6 V | 672 mW wht +336 mW grn | 216 mW wht +132 mW grn | 28.9% | 39.2% | 34.5% | 46.6% |

The output voltage $V_{OUT1}$ on the terminal 142 will typically be 3.9 volts, but can increase or decrease as the forward voltage of the white LED 150 changes. This is important, because the regulating charge pump 1300 of the embodiment of FIG. 13 uses minimum output power at all times. The forward ISINK1 current 190 and the forward ISINK2 current 192 of the white LEDs 150 can easily be reduced by reducing the 150 mV reference voltage 206 on the OpAmp 194 of the load current regulator 163 to provide a dimming feature. When the ISINK1 current 190 and the ISINK2 current 192 decrease, the forward voltage drop $V_F$ decreases. In the circuit of FIG. 13, the output voltage $V_{OUT1}$ on the terminal 142 follows to provide the highest possible efficiency. Temperature effects on the forward voltage $V_F$ are also automatically compensated.

The total current through the four green LEDs 154 will be identical to the white LED 150 total current (60 mA), since in equilibrium, the Cx charge current is equal to the discharge current. In the circuit of FIG. 13, the green LED 154 current will flow only during the charge half cycle. If a filter capacitor is added on the $V_{OUT2}$ terminal 144 in parallel to ground, DC current will flow in the green LEDs 154 in a similar manner to that previously described with respect to the white LEDs 150. Current sharing in the green LEDs 154 is of less concern than the white LEDs 150, since the green LEDs are generally used only to provide back light for the cell phones keys. The white LEDs 150 are used to backlight the color TFT display, and should have equal currents to prevent uneven lighting and uneven coloration of the display.

The circuit of FIG. 13 operates at various frequencies and values of the charge storage component 114. In general, the charge storage component 114 should have a high value, and the frequency of the square wave oscillator 120 should be as high as possible to keep the ripple voltage on the charge storage component 114 low. This will minimize losses in the charge storage component 114 and will extend the dynamic range of the output voltage $V_{OUT1}$ on the terminal 142 and the output voltage $V_{OUT2}$ on the terminal 144 because the charge storage component 114 ripple voltage will not limit the extremes of the input voltage $V_{IN}$ on the input terminal 103, the output voltage $V_{OUT1}$ on the terminal 142 and the output voltage $V_{OUT2}$ on the terminal 144. It should also be appreciated that the present invention is scalable to other quantities of LEDs 150, 154 by adding or removing the N-FETs 196, 200 to the current mirror in the load current regulator 163, described below.

Figure 16:
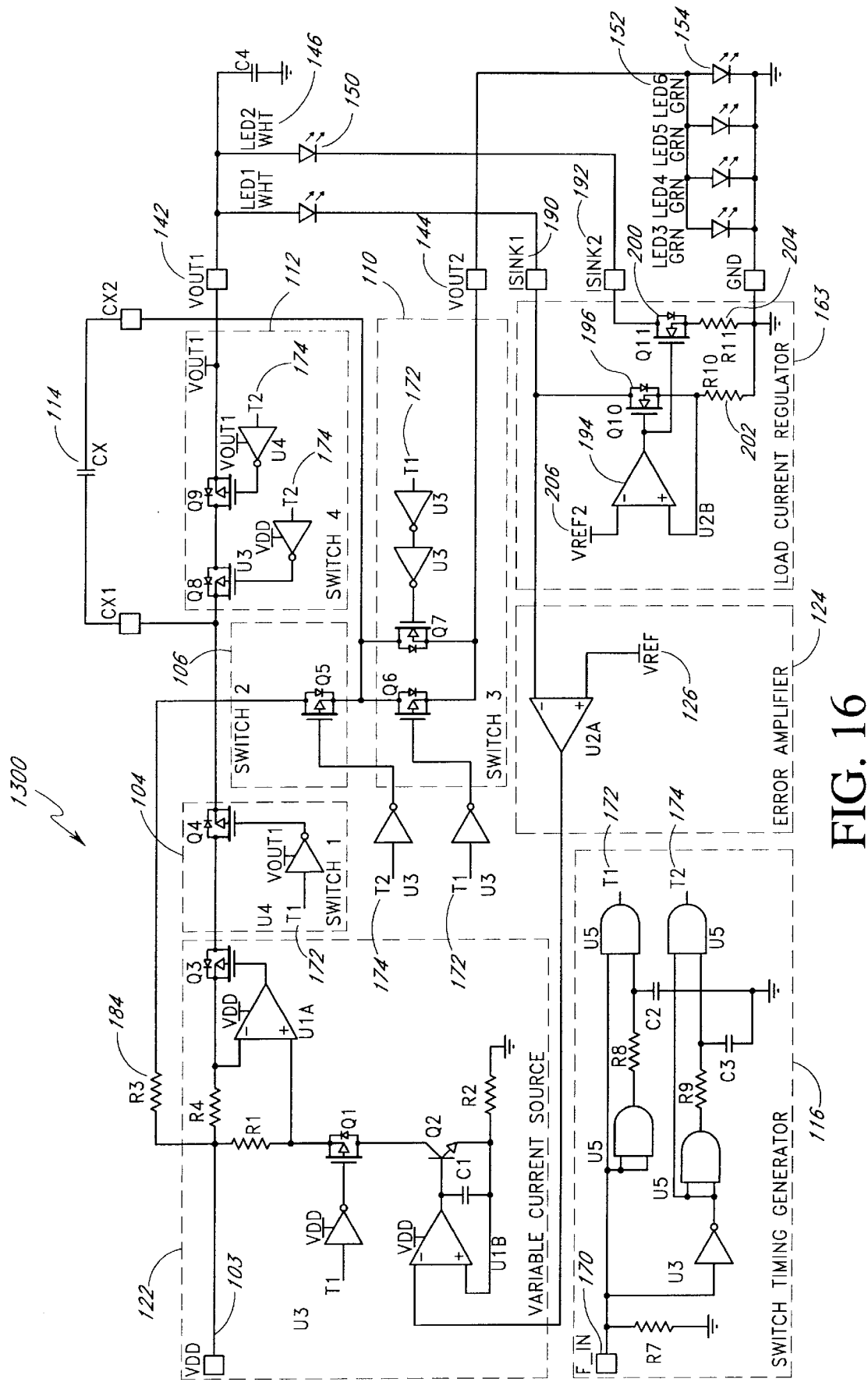
FIG. 16 is a detailed circuit diagram of the charge pump with load current regulation of FIG. 13.

FIG. 16 is a detailed circuit diagram of the charge pump 1300 with load current regulation of FIG. 13. FIG. 16 illustrates one embodiment of the switches 104, 106, 110, 112 in greater detail. Each of the switches 104 and S2 106 comprises a type 74ACT11240 inverter and a type NDS332P P-FET. The input of the inverter in the switch 104 receives the T1 control signal 172, and the input of the inverter in the switch 106 receives the T2 control signal 174. The output of the inverter in each switch 104, 106 is connected to the gate of the associated P-FET.

The switch 110 comprises a type 74ACT11240 inverter with the output thereof connected to the gate of a type NDS332P P-FET. The switch 110 also comprises two type 74ACT11240 inverters connected in series with the output of the second inverter connected to the gate of a type FDV303N N-FET. The type NDS332P P-FET and the type FDV303N N-FET are connected as a parallel pair so that the first terminal of the switch 110 floats above the circuit ground 130 without turning off the switch 110. The inputs of the switch 110, corresponding to the inputs of the inverters, receives the T1 control signal 172.

The switch 112 comprises two type 74ACT11240 inverters each having the output thereof connected to the gate of a respective type NDS332P P-FET. The input of each of the inverters of the switch 112 receives the T2 control signal 174. The two type NDS332P P-FETs are connected in series to form the two terminals of the switch 112, wherein a first terminal of the switch 112 is connected to the second terminal of the switch 104. The second terminal of the switch 112 is connected to the terminal 142 to provide the output voltage $V_{OUT1}$. The first terminal of the switch 110 is connected to the second terminal of the switch 106. The second terminal of the switch 110 is connected to the terminal 144 to provide the output voltage $V_{OUT2}$.

The variable current source 122 of the embodiment of FIG. 16 comprises two type LM6152 OpAmps (U1B and U1A), two type NDS332P P-FETs (Q1 and Q3), a type 74ACT11240 inverter, and a type 2N3904 transistor (Q2). The output of a first OpAmp (U1B) is connected to the base of the transistor (Q2). The variable current source 122 also comprises a 20 nF capacitor (C1) connected between the output and the inverting input of the first OpAmp (U1B) and between the base and emitter of the transistor (Q2). A 400 Ω resistor (R2) is connected between the emitter of the transistor (Q2) and the circuit ground 130.

The input of the inverter receives the T1 control signal 172, and the output of the inverter is connected to the gate of a first type NDS332P P-FET (Q1). The inverter and the first type NDS332P P-FET (Q1) interrupt the charge current to the charge storage component 114 when the charge storage component 114 is discharging into the first load 146. The drain of the first type NDS332P P-FET (Q1) is connected to the collector of the transistor (Q2), and the source of the first type NDS332P P-FET (Q1) is connected to the non-inverting input of the second OpAmp (U1A). A 200-ohm resistor (R1) is connected between the non-inverting input of the second OpAmp (U1A) and the input terminal 103. A 2-ohm resistor (R4) is connected between the input terminal 103 and the inverting input of the second OpAmp (U1A). The output of the second OpAmp (U1A) is connected to the gate of the second type NDS332P P-FET (Q3). The source of the second type NDS332P P-FET (Q3) is connected to the inverting input of the second OpAmp (U1A), and to the drain of the second type NDS332P P-FET (Q3) is connected to the first terminal of the switch 104. A resistor (R3) 184 is connected between the input terminal 103 and the first terminal of the switch 106.

Note that in FIG. 16, the variable current source 122 is located in the path between the input voltage terminal 103 and the switch 104 rather than being in the path between the switch 110 and the output terminal 144, as described in FIGS. 4, 9, 12 and 13. It should be understand that the variable current source 122 in FIG. 16 is in the charging path of the charging component 114 and controls the charging current in the same manner as described above in connection with FIGS. 4, 9, 12 and 13.

As discussed above, the regulating charge pump 1300 of FIG. 16 also comprises an error amplifier 124. The output of the amplifier 124 is connected to inverting input of the first OpAmp (U1B) of the variable current source 122 to regulate the current supplied by the variable current source 122. In this embodiment, the amplifier 124 is a LM6152 type operational amplifier (OpAmp). The inverting input of the amplifier 124 is connected to the output terminal of one of the white LEDs 150. This enables the regulating charge pump 1300 of this embodiment to track changes in the forward voltage of the white LED 150. A voltage reference 126 is connected to the non-inverting input of the amplifier 124. In this embodiment, the voltage reference 126 provides a fixed, 300 mV signal. In alternative embodiments, the voltage reference 126 provides a variable signal. In further alternatives, the voltage reference 126 is selectable among a plurality of fixed values.

In the embodiment of FIG. 16, the output voltage $V_{OUT1}$ on the terminal 142 is regulated at approximately 3.9 volts, which corresponds to a voltage at the output terminal of one of the white LEDs 150 of 300 mV with a 3.6-volt forward voltage drop. The output voltage $V_{OUT1}$ on the terminal 142 is provided to the first load 146. In the embodiment of FIG. 16, the first load 146 comprises a capacitive component of approximately 10 μF in parallel with a plurality of white LEDs 150.

The regulating charge pump 1300 also provides a second output voltage $V_{OUT2}$ on the terminal 144 to the second load 152. In this embodiment, the output voltage $V_{OUT2}$ on the terminal 144 is regulated to provide approximately 40 mA of current to the second load 152. In this embodiment, the output voltage $V_{OUT2}$ on the terminal 144 is the voltage present at the second terminal of the switch 110, and the second load 152 comprises a plurality of green LEDs 154 connected in parallel between the $V_{OUT2}$ terminal 144 and the circuit ground 130.

In the embodiment of FIG. 16, the second load 152 is interposed between the variable current source 122 and circuit ground 130. In this embodiment, the regulated current 156 flowing from the variable current source 122 is available to the second load 152 at the difference between the voltage developed by the power source 102 and the steady state charge on the charge storage component 114 minus losses in the switches 104, 110.

The regulating charge pump 1300 of this embodiment also comprises a load current regulator 163. The load current regulator 163 regulates the ISINK1 current 190 through a first white LED 150 of the first load 146 and the ISINK2 current 192 through the second white LED 150 of the first load 146. In this embodiment, the ISINK1 current 190 and the ISINK2 current 192 are regulated at 30 mA each to provide improved parity of lighting from the two white LEDs 150.

The load current regulator 163 of this embodiment comprises a type LM6152 OpAmp 194, two type FDV303N N-FETs 196, 200, two 5-ohm resistors 202, 204, and a voltage reference ($V_{RF2}$) 206. In this embodiment, the $V_{REF2}$ voltage reference 206 provides a fixed 150 mV signal to the inverting input of the OpAmp 194. The non-inverting input of the OpAmp 194 is connected to a first terminal of the resistor (R10) 202, and the output of the OpAmp 194 is connected to the gates of the N-FETs 196, 200. Respective first terminals of the resistors 202 and 204 are connected to the sources of the N-FETs 196, 200, respectively. The second terminals of the resistors 202, 204 are connected to the circuit ground 130. The N-FETs 196, 200 operate as a current mirror so that the ISINK2 current tracks the ISINK1 current, which controls the OpAmp 194. In the embodiment of FIG. 16, the voltage reference ($V_{REF}$) 126 in the error amplifier 124 is selected to provide a sufficient voltage across the N-FET 196 and the resistor 202 to ensure linear operation.

When the ISINK1 current 190 and the ISINK2 current 192 have magnitudes of 30 mA, the voltage appearing at the non-inverting input of the OpAmp 194 of the load current regulator 163 will be approximately 150 mV, and the voltage appearing at the drain of the N-FET 196 will be approximately 300 mV. Thus, the error amplifier 124 will generate a minimal corrective signal to the variable current source.

In particularly preferred embodiments, the regulating charge pumps 100, 200, 900, 1300 are fabricated on respective single semiconductor chips in a manner well understood by one of skill in the art. However, it will also be appreciated that the regulating charge pump 100, 200, 900, 1300 described herein can also be fabricated from discrete components and with circuit elements of different parameters to provide different operating parameters and to accommodate loads 152, 400 and power supplies 102 having different parameters. It will be further appreciated that additional switches and charge storage components can be included with modifications to the switch timing control to enable alternative boost multiplications in alternative embodiments of the invention.

Although the foregoing description of the preferred embodiment of the present invention has shown, described, and pointed out the fundamental novel features of the invention, it will be understood that various omissions, substitutions, and changes in the form of the detail of the apparatus as illustrated as well as the uses thereof, may be made by those skilled in the art without departing from the spirit of the present invention. Consequently, the scope of the present invention should not be limited to the foregoing discussions, but should be defined by the appended claims.

What is claimed is:

1. A multiple output regulating charge pump that receives a supply voltage and that provides at least a first output and a second output, wherein the first output has a first voltage and the second output has a second voltage, a current provided to a first load connected to the first output is actively current regulated, the first output drives a first set of light emitting diodes, the second output drives a second set of light emitting diodes, and the first output voltage varies to compensate for temperature variations of the first set of light emitting diodes.

2. A multiple output regulating charge pump that receives a supply voltage and that provides at least a first output and a second output, wherein the first output has a first voltage and the second output has a second voltage, wherein a current provided to a first load connected to the first output is actively current regulated, wherein the first output drives a first set of light emitting diodes while the second output drives a second set of light emitting diodes, and wherein the first set of light emitting diodes are placed in a parallel configuration such that each light emitting diode conducts a respective current, and each respective current is controlled by a respective current sink.

3. The charge pump of claim 2, wherein the current sinks are current mirror circuits that each comprise at least one transistor.

4. The charge pump of claim 3, wherein a feedback circuit controls a charging current of the charge pump to ensure that the current mirror circuits operate linearly.

5. The charge pump of claim 2, wherein the second set of light emitting diodes are placed in a parallel configuration and conduct a total current that is substantially identical to a total current of the first set of light emitting diodes.

6. A multiple output regulating charge pump that receives a supply voltage and that provides at least a first output and a second output, wherein the first output has a first voltage and the second output has a second voltage, wherein a current provided to a first load connected to the first output is actively current regulated, wherein the charge pump comprises a charge storage component and a plurality of switches connected to the charge storage component under control of a switch timing control circuit, and wherein the switch timing control circuit controls the switches to connect the charge storage component in series with the supply voltage and the first output when the charge storage component is discharged and to connect the charge storage component in series with the supply voltage and the second output when the charge storage component is charged.

7. A regulating charge pump that receives a supply voltage and that provides currents to at least a first load and a second load, the charge pump comprising:
 a charge storage component;
 a variable current source;
 a reference voltage;
 a feedback voltage;
 an error amplifier that compares the reference voltage with the feedback voltage and that provides control signals to the variable current source;
 a plurality of switches that selectively interconnect the supply, the charge storage component, the variable current source, the error amplifier, the first load and the second load;

a switch timing control circuit that controls the switches such that the variable current source supplies charging current to the charge storage component and the second load; and a load current regulator coupled in series with the first load, wherein currents within parallel branches of the first load are actively balanced by current mirror circuits.

8. The charge pump of claim 7, wherein the feedback voltage corresponds to a voltage of one of the current mirror circuits.

9. The charge pump of claim 7, wherein the switch timing control circuit operates the switches such that the charge pump alternately provides current to the first load as the charge storage component discharges and provides current to the second load as the charge storage component charges.

10. The charge pump of claim 9, wherein the first load is a set of parallel light emitting diodes.

11. The charge pump of claim 9, wherein the reference voltage is a fixed value.

12. The charge pump of claim 9, wherein the reference voltage is selectable among a plurality of reference voltage values.

* * * * *